United States Patent
Wang

(10) Patent No.: US 9,049,340 B2
(45) Date of Patent: Jun. 2, 2015

(54) METHOD AND APPARATUS FOR ADJUSTING SITE BANDWIDTH, CONFERENCING TERMINAL, AND MEDIA CONTROL SERVER

(71) Applicant: Huawei Device Co., Ltd., Shenzhen (CN)

(72) Inventor: Pulin Wang, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 93 days.

(21) Appl. No.: 13/910,383

(22) Filed: Jun. 5, 2013

(65) Prior Publication Data

US 2013/0265385 A1    Oct. 10, 2013

Related U.S. Application Data

(63) Continuation of application No. PCT/CN2011/083661, filed on Dec. 8, 2011.

(30) Foreign Application Priority Data

Dec. 8, 2010   (CN) ............ 2010 1 0578840

(51) Int. Cl.
   *H04N 7/15*     (2006.01)
   *H04L 12/825*   (2013.01)
   (Continued)

(52) U.S. Cl.
   CPC ............ *H04N 7/15* (2013.01); *H04N 7/152* (2013.01); *H04L 47/25* (2013.01); *H04L 47/38* (2013.01);
   (Continued)

(58) Field of Classification Search
   CPC ...... H04N 7/15; H04N 7/152; H04L 65/4038; H04L 65/80; H04L 12/1818; H04L 65/1006; H04L 65/1009; H04L 65/1069; H04L 47/25; H04L 47/38
   See application file for complete search history.

(56) References Cited

U.S. PATENT DOCUMENTS

2004/0257433 A1   12/2004   Lia et al.
2005/0007446 A1   1/2005    Schrader et al.
(Continued)

FOREIGN PATENT DOCUMENTS

CN   1581970 A    2/2005
CN   1820505 A    8/2006
(Continued)

OTHER PUBLICATIONS

Foreign Communication From A Counterpart Application, PCT Application No. PCT/CN2011/083661, Chinese Search Report dated Mar. 15, 2012, 6 pages.
(Continued)

*Primary Examiner* — Melur Ramakrishnaiah
(74) *Attorney, Agent, or Firm* — Conley Rose, P.C.; Grant Rodolph; Nicholas K. Beaulieu

(57) ABSTRACT

A method and an apparatus for adjusting site bandwidth, a conferencing terminal, and a media control server are disclosed. The method includes: obtaining the number of streams at a multi-screen site, and assigning bandwidth to each stream according to preset total bandwidth of multiple streams, maximum bandwidth of a single stream, and a preset bandwidth assignment method; and obtaining a conference joining state of each stream, and adjusting bandwidth of each stream according to the conference joining state of each stream. The apparatus includes an assigning module, an obtaining module, and a first adjusting module. Embodiments of the present invention implement dynamic adjustment of bandwidth resources of each stream according to the actual condition of a conference, so that bandwidth resources of each site are fully utilized.

29 Claims, 9 Drawing Sheets

Obtain the number of streams at a multi-screen site, and assign bandwidth to each stream according to preset total bandwidth of multiple streams, maximum bandwidth of a single stream, and a preset bandwidth assignment method ~101

Obtain a conference joining state of each stream, and adjust bandwidth of each stream according to the conference joining state of each stream ~102

(51) Int. Cl.
  *H04L 29/06* (2006.01)
  *H04L 12/18* (2006.01)
  *H04L 12/811* (2013.01)

(52) U.S. Cl.
  CPC ........ *H04L 65/4038* (2013.01); *H04L 12/1818* (2013.01); *H04L 65/1006* (2013.01); *H04L 65/1009* (2013.01); *H04L 65/1069* (2013.01); *H04L 65/80* (2013.01)

(56) References Cited

U.S. PATENT DOCUMENTS

2007/0211141 A1* 9/2007 Christiansen .............. 348/14.08
2008/0267069 A1 10/2008 Thielman et al.
2009/0040289 A1* 2/2009 Hetherington et al. .... 348/14.12

FOREIGN PATENT DOCUMENTS

CN 101262587 A 9/2008
WO 2007103412 A2 9/2007

OTHER PUBLICATIONS

Foreign Communication From A Counterpart Application, PCT Application No. PCT/CN2011/083661, Chinese Written Opinion dated Mar. 15, 2012, 5 pages.

Foreign Communication From A Counterpart Application, European Application No. 11846355.3, Extended European Search Report dated Dec. 2, 2013, 6 pages.

* cited by examiner

METHOD AND APPARATUS FOR ADJUSTING SITE BANDWIDTH, CONFERENCING TERMINAL, AND MEDIA CONTROL SERVER

CROSS-REFERENCE TO RELATED APPLICATIONS

This application is a continuation of International Application No. PCT/CN2011/083661, filed on Dec. 8, 2011, which claims priority to Chinese Patent Application No. 201010578840.8, filed on Dec. 8, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communication technologies, and in particular, to a method and an apparatus for adjusting site bandwidth, a conferencing terminal, and a media control server.

BACKGROUND

With the development of encoding and information compression technologies and the fast development of digital networks, a video conferencing system is gradually developed based on an Internet Protocol (IP) network in terms of research and applications. With the rapid development of the IP network, applications of the video conferencing system and especially the video conferencing system based on an H.323 video conferencing standard, are increasingly wider. Video conferencing systems are almost deployed in all sectors such as governments, militaries, and enterprises to improve the conferencing efficiency and reduce the conferencing cost. In the video conferencing system, on-the-spot experience is enhanced by an image stitching technology and true-to-life display; a more real video communication effect is provided by multiple cameras and multi-screen outputs, that is, a site may include multiple mutually corresponding cameras, multiple video conferencing terminals, and multiple displays, which are used to collect, receive and send, and display corresponding images, respectively.

In the prior art, in a process of convening a telepresence conference, one method is: according to the number of accessed conference screens selected beforehand, selecting to use corresponding multi-screen streams to perform conference access with certain bandwidth, where channel bandwidth corresponding to each screen is fixed and unchanged, and another method is: after multiple streams are convened into the conference, dynamically monitoring a feature of each screen in the conference, and after detecting that a screen leaves the conference, directly releasing the bandwidth corresponding to the screen, and keeping the bandwidth of other screens unchanged, that is, the method does not correspondingly adjust bandwidth of other screens according to the actual condition after the bandwidth of a screen is released.

Evidently, in the prior art, after the conference begins, bandwidth of streams of each screen joining the conference cannot be adjusted in real time according to the actual condition, and as a result, bandwidth resources cannot be properly used.

SUMMARY

Embodiments of the present invention provide a method and an apparatus for adjusting site bandwidth, a conferencing terminal, and a media control server, in order to implement dynamic adjustment of bandwidth resources of each stream according to the actual condition of a conference and fully utilize bandwidth resources of each site.

To achieve the objectives, in a first aspect, an embodiment of the present invention provides a method for adjusting site bandwidth, applicable to a conference process at a multi-screen site. The method includes: obtaining the number of streams at the multi-screen site, and assigning bandwidth to each stream according to preset total bandwidth of multiple streams, maximum bandwidth of a single stream, and a preset bandwidth assignment method; and obtaining a conference joining state of each stream, and adjusting bandwidth of each stream according to the conference joining state of each stream.

In a first possible implementation form of the method according to the first aspect, where the assigning bandwidth to each stream according to preset total bandwidth of multiple streams, maximum bandwidth of a single stream, and a preset bandwidth assignment method comprises: assigning bandwidth to each stream by using an average assignment method or a weighted assignment method according to the preset total bandwidth of multiple streams and the maximum bandwidth of a single stream, where the assigning bandwidth to each stream by using an average assignment method comprises assigning the total bandwidth of multiple streams to the streams at the multi-screen site averagely, and corresponding bandwidth assigned to each stream by using the weighted assignment method is a product of the total bandwidth of multiple streams and a weighting coefficient corresponding to the each stream; where, a sum of the bandwidth corresponding to the streams is smaller than or equal to the total bandwidth of multiple streams, and a maximum value in the bandwidth corresponding to the streams is smaller than or equal to the maximum bandwidth of a single stream.

In a second possible implementation form of the method according to the first aspect as such or according to the first implementation form of the first aspect, where the obtaining a conference joining state of each stream at the multi-screen site comprises: according to transmission of streams at the multi-screen site, determining whether each stream joins a conference; when a stream is not received, determining that a conference joining state of the stream is unjoined; when a stream is received, detecting change of the stream, and when content of the stream changes, determining that a conference joining state of the stream is normally joined; when the content of the stream does not change, determining that the conference joining state of the stream is statically joined.

In a third possible implementation form of the method according to the second implementation form of the first aspect, where the adjusting bandwidth of each stream according to the conference joining state of each stream comprises: comparing the obtained conference joining state of each stream with a previous conference joining state of each stream; when a conference joining state of one or more streams among the streams changes from normally joined or unjoined to statically joined, adjusting bandwidth of the one or more streams whose conference joining state changes to statically joined among the streams to first stream bandwidth;

and when a conference joining state of one or more streams among the streams changes from normally joined or statically joined to unjoined, adjusting bandwidth of the one or more streams whose conference joining state changes to unjoined among the streams to second stream bandwidth, where the first stream bandwidth is greater than the second stream bandwidth; obtaining first total bandwidth according to the number of streams that statically join the conference, the number of streams that do not join the conference, the first stream bandwidth, and the second stream bandwidth, where the first total bandwidth is a sum of a product of the first stream bandwidth and the number of streams that statically join the conference and a product of the second stream bandwidth and the number of streams that do not join the conference; where the number of streams that statically join the conference is the number of streams currently in a statically joined state among the streams, and the number of streams that do not join the conference is the number of streams currently in an unjoined state; and according to the maximum bandwidth of a single stream and the remaining bandwidth, using the average assignment method or the weighted assignment method to adjust bandwidth of streams in a normally joined state among the streams, where the adjusted bandwidth of each stream in a normally joined state is greater than the first stream bandwidth, where the remaining bandwidth is a difference between the total bandwidth of multiple streams and the first total bandwidth.

In a fourth possible implementation form of the method according to the second implementation form of the first aspect, where when the conference joining state of the stream is normally joined, the adjusting bandwidth of each stream according to the conference joining state of each stream comprises: using a preset bandwidth adjustment time segment as a unit, and determining a bandwidth assignment coefficient corresponding to each stream in the bandwidth adjustment time segment; and adjusting bandwidth of each stream in the preset bandwidth adjustment time segment to a product of the total bandwidth of multiple streams and the bandwidth assignment coefficient corresponding to the each stream; where a sum of the bandwidth assignment coefficients corresponding to the streams is smaller than or equal to 1.

In a fifth possible implementation form of the method according to the fourth implementation form of the first aspect, where the using a preset bandwidth adjustment time segment as a unit, and determining a bandwidth assignment coefficient corresponding to each stream in the bandwidth adjustment time segment comprises: using an interval between adjacent frames of an image as the preset bandwidth adjustment time segment; calculating a sum of absolute pixel differences of a current-frame image and a previous-frame image of each stream in the bandwidth adjustment time segment, to obtain an image change pixel amplitude of each stream; obtaining a sum of the image change pixel amplitudes of the streams by calculation; and performing a ratio operation to obtain a ratio of an image change pixel amplitude of each stream to the sum of the image change pixel amplitudes of the streams, and using the ratio as the bandwidth assignment coefficient of each stream.

In a sixth possible implementation form of the method according to the fourth implementation form of the first aspect, further comprising: in a previous preset bandwidth adjustment time segment, encoding each stream according to bandwidth assigned to each stream in the previous preset bandwidth adjustment time segment, and obtaining actual encoding bandwidth and an average quantization parameter of each encoded stream; in a current preset bandwidth adjustment time segment, counting total output traffic of the streams in the previous preset bandwidth adjustment time segment according to the actual encoding bandwidth and the average quantization parameter of the streams in the previous preset bandwidth adjustment time segment; and adjusting target bandwidth of each stream and adjusting a quantization parameter or a frame rate of each stream in the current preset bandwidth adjustment time segment according to the total output traffic of the streams.

In a seventh possible implementation form of the method according to the sixth implementation form of the first aspect, where the adjusting target bandwidth and a quantization parameter or a frame rate of each stream in the current preset bandwidth adjustment time segment according to the total output traffic of the streams comprises: when the total output traffic of the streams in the previous preset bandwidth adjustment time segment exceeds a preset stream traffic threshold, causing each stream to simultaneously skip encoding in the current preset bandwidth adjustment time segment so that each stream is encoded in a next preset bandwidth adjustment time segment; when the total output traffic of the streams does not exceed the preset stream traffic threshold, assigning the target bandwidth and a value range of the quantization parameter corresponding to each stream according to change of content of each stream in the current preset bandwidth adjustment time segment, so that each stream is encoded according to the target bandwidth and the value range of the quantization parameter corresponding to each stream.

In an eighth possible implementation form of the method according to the second implementation form of the first aspect, where the detecting change of the stream is specifically detecting change of the stream by using a motion detection method or an intelligent detection method.

In a second aspect, an embodiment of the present invention provides an apparatus for adjusting site bandwidth, applicable to a conference process at a multi-screen site. The apparatus includes: an assigning module configured to obtain the number of streams at the multi-screen site, and assign bandwidth to each stream according to preset total bandwidth of multiple streams, maximum bandwidth of a single stream, and a preset bandwidth assignment method; an obtaining module configured to obtain a conference joining state of each stream; and a first adjusting module configured to adjust bandwidth of each stream according to the obtained conference joining state of each stream.

In a first possible implementation form of the apparatus according to the second aspect, where the assigning module comprises: a first assigning unit configured to assign bandwidth to each stream by using an average assignment method according to the preset total bandwidth of multiple streams and the maximum bandwidth of a single stream, where the assign bandwidth to each stream by using an average assignment method comprises assign the total bandwidth of multiple streams to the streams at the multi-screen site averagely; and a second assigning unit configured to assign bandwidth to each stream by using a weighted assignment method according to the preset total bandwidth of multiple streams and the maximum bandwidth of a single stream, where the corresponding bandwidth assigned to each stream is a product of the total bandwidth of multiple streams and a weighting coefficient corresponding to the each stream; where, a sum of the bandwidth corresponding to the streams is smaller than or equal to the total bandwidth of multiple streams, and a maximum value in the bandwidth corresponding to the streams is smaller than or equal to the maximum bandwidth of a single stream.

In a second possible implementation form of the apparatus according to the second aspect as such or according to the first implementation form of the second aspect, where the obtaining module comprises: a first determining unit configured to determine, according to transmission of streams at the multi-screen site, whether each stream joins a conference, and when a stream is not received, determine that a conference joining state of the stream is unjoined; a second determining unit configured to: when a stream is received, detect change of the stream, and when content of the stream changes, determine that a conference joining state of the stream is normally joined; when the content of the stream does not change, determine that the conference joining state of the stream is statically joined.

In a third possible implementation form of the apparatus according to the second implementation form of the second aspect, where the first adjusting module comprises: a comparing unit configured to compare the obtained conference joining state of each stream with a previous conference joining state of each stream, and obtain a comparison result of the conference joining state of each stream; a first adjusting unit configured to: when a comparison result of a conference joining state of one or more streams among the streams indicates that the conference joining state changes from normally joined or unjoined to statically joined, adjust bandwidth of the one or more streams whose conference joining state changes to statically joined among the streams to first stream bandwidth; and when a comparison result of a conference joining state of one or more streams among the streams indicates that the conference joining state changes from normally joined or statically joined to unjoined, adjust bandwidth of the one or more streams whose conference joining state changes to unjoined among the streams to second stream bandwidth, where the first stream bandwidth is greater than the second stream bandwidth; an obtaining unit configured to obtain first total bandwidth according to the number of streams that statically join the conference, the number of streams that do not join the conference, the first stream bandwidth, and the second stream bandwidth, where the first total bandwidth is a sum of a product of the first stream bandwidth and the number of streams that statically join the conference and a product of the second stream bandwidth and the number of streams that do not join the conference, where the number of streams that statically join the conference is the number of streams currently in a statically joined state among the streams, and the number of streams that do not join the conference is the number of streams currently in an unjoined state; and a second adjusting unit configured to use, according to the maximum bandwidth of a single stream and the remaining bandwidth, the average assignment method or the weighted assignment method to adjust bandwidth of streams in a normally joined state among the streams, where the adjusted bandwidth of each stream in a normally joined state is greater than the first stream bandwidth, where the remaining bandwidth is a difference between the total bandwidth of multiple streams and the first total bandwidth.

In a fourth possible implementation form of the apparatus according to the second implementation form of the second aspect, where the first adjusting module comprises: a third determining unit configured to: when the conference joining state of the stream is normally joined, use a preset bandwidth adjustment time segment as a unit, and determine a bandwidth assignment coefficient corresponding to each stream in the bandwidth adjustment time segment; and a third adjusting unit configured to adjust bandwidth of each stream in the preset bandwidth adjustment time segment to a product of the total bandwidth of multiple streams and the bandwidth assignment coefficient corresponding to the each stream, where a sum of the bandwidth assignment coefficients corresponding to the streams is smaller than or equal to 1.

In a fifth possible implementation form of the apparatus according to the fourth implementation form of the second aspect, where the third determining unit comprises: a setting subunit configured to use an interval between adjacent frames of an image as the preset bandwidth adjustment time segment; a first calculating subunit configured to calculate a sum of absolute pixel differences of a current-frame image and a previous-frame image of each stream in the bandwidth adjustment time segment, to obtain an image change pixel amplitude of each stream; a second calculating subunit configured to obtain a sum of image change pixel amplitudes of the streams by calculation; and a third calculating subunit configured to perform a ratio operation to obtain a ratio of the image change pixel amplitude of each stream to the sum of the image change pixel amplitudes of the streams, and use the ratio as the bandwidth assignment coefficient of each stream.

In a sixth possible implementation form of the apparatus according to the fourth implementation form of the fourth aspect, further comprising: an encoding module configured to encode, in a previous preset bandwidth adjustment time segment, each stream according to bandwidth assigned to each stream in the previous preset bandwidth adjustment time segment, and obtain actual encoding bandwidth and an average quantization parameter of each encoded stream; a counting module configured to count, in a current preset bandwidth adjustment time segment, total output traffic of the streams in the previous preset bandwidth adjustment time segment according to the actual encoding bandwidth and the average quantization parameter of the streams in the previous preset bandwidth adjustment time segment; and a second adjusting module configured to adjust target bandwidth and a quantization parameter or a frame rate of each stream in the current preset bandwidth adjustment time segment according to the total output traffic of the streams.

In a seventh possible implementation form of the method according to the sixth implementation form of the first aspect, where the second adjusting module comprises: a fourth adjusting unit configured to cause each stream to simultaneously skip encoding in the current preset bandwidth adjustment time segment when the total output traffic of the streams exceeds a preset stream traffic threshold, so that each stream is encoded in a next preset bandwidth adjustment time segment; and a fifth adjusting unit configured to assign the target bandwidth and a value range of the quantization parameter corresponding to each stream according to change of each stream in the current preset bandwidth adjustment time segment when the total output traffic of the streams does not exceed the preset stream traffic threshold, so that each stream is encoded according to the target bandwidth and the value range of the quantization parameter corresponding to each stream.

In a third aspect, an embodiment of the present invention provides a conferencing terminal, comprising a main control module and multiple encoders, where the conferencing terminal further comprises the apparatus for adjusting site bandwidth according to the second aspect as such or any of the first to the seventh implementation forms of the second aspect, where: the main control module is configured to set total bandwidth of multiple streams and maximum bandwidth of a single stream, and output the total bandwidth of multiple streams and the maximum bandwidth of a single stream to the apparatus for adjusting site bandwidth; and the multiple encoders are each configured to obtain adjusted bandwidth of each stream from the apparatus for adjusting site bandwidth, and encode each stream according to the adjusted bandwidth of each stream.

In a fourth aspect, an embodiment of the present invention provides a media control server, comprising a main control module and multiple encoders, where the media control server further comprises the apparatus for adjusting site bandwidth according to the second aspect as such or any of the first to the seventh implementation forms of the second aspect, where: the main control module is configured to set total bandwidth of multiple streams and maximum bandwidth of a single stream, and output the total bandwidth of multiple streams and the maximum bandwidth of a single stream to the apparatus for adjusting site bandwidth; and the multiple encoders are each configured to obtain adjusted bandwidth of each stream from the apparatus for adjusting site bandwidth, and encode each stream according to the adjusted bandwidth of each stream.

An embodiment of the present invention further provides a conferencing terminal, including a main control module and multiple encoders and further including the apparatus for adjusting site bandwidth, where: the main control module is configured to set total bandwidth of multiple streams and maximum bandwidth of a single stream, and output the total bandwidth of multiple streams and the maximum bandwidth of a single stream to the apparatus for adjusting site bandwidth; and the multiple encoders are each configured to obtain adjusted bandwidth of each stream from the apparatus for adjusting site bandwidth, and encode each stream according to the adjusted bandwidth of each stream.

An embodiment of the present invention further provides a media control server, including a main control module and multiple encoders and further including the apparatus for adjusting site bandwidth, where: the main control module is configured to set total bandwidth of multiple streams and maximum bandwidth of a single stream, and output the total bandwidth of multiple streams and the maximum bandwidth of a single stream to the apparatus for adjusting site bandwidth; and the multiple encoders are each configured to obtain adjusted bandwidth of each stream from the apparatus for adjusting site bandwidth, and encode each stream according to the adjusted bandwidth of each stream.

By using the method and apparatus for adjusting site bandwidth, the conferencing terminal, and the media control server provided by the embodiments of the present invention, the number of streams at a multi-screen site is obtained, corresponding bandwidth is assigned to each stream at the multi-screen site according to preset total bandwidth of multiple streams, maximum bandwidth of a single stream, and a preset bandwidth assignment method, and in a conference process, bandwidth of each stream is adjusted according to the obtained conference joining state of each stream. According to the actual condition of a conference, the embodiments implement dynamic adjustment of bandwidth resources of each stream joining the conference, so that bandwidth resources of each site are fully utilized.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may derive other drawings from these accompanying drawings without creative efforts.

DETAILED DESCRIPTION

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
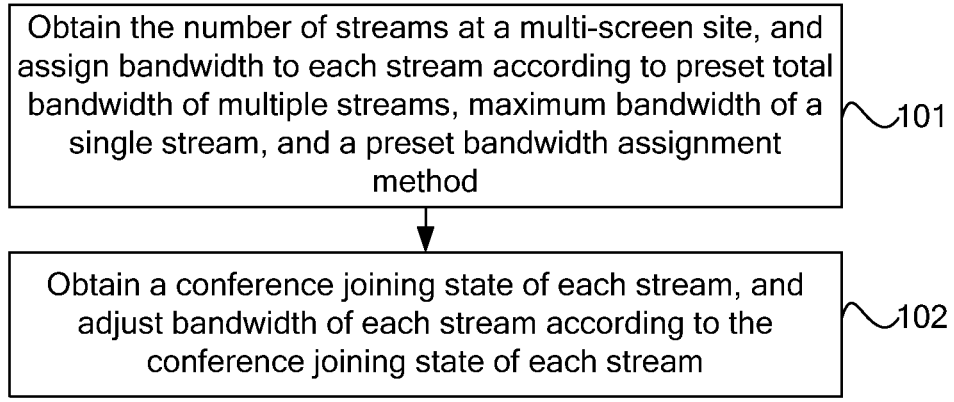
FIG. 1 is a flowchart of Embodiment 1 of a method for adjusting site bandwidth according to the present invention.
Figure 2:
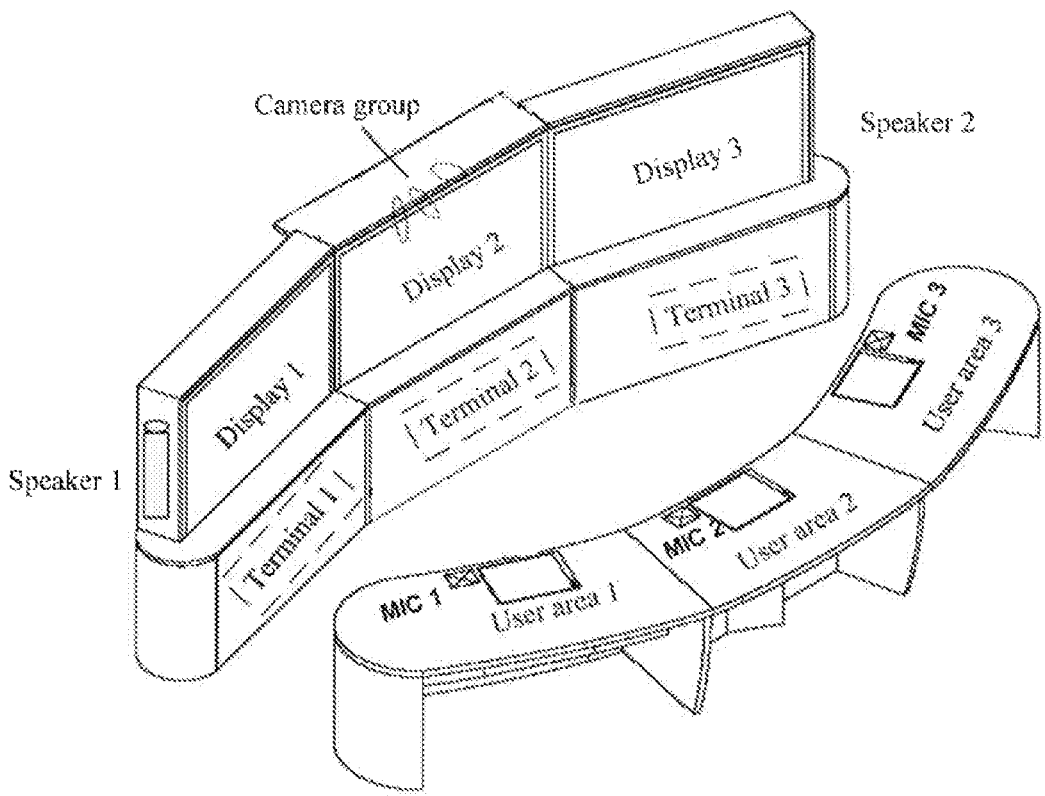
FIG. 2 is a schematic diagram of a multi-screen site in Embodiment 1 of a method for adjusting site bandwidth according to the present invention.
Figure 3:
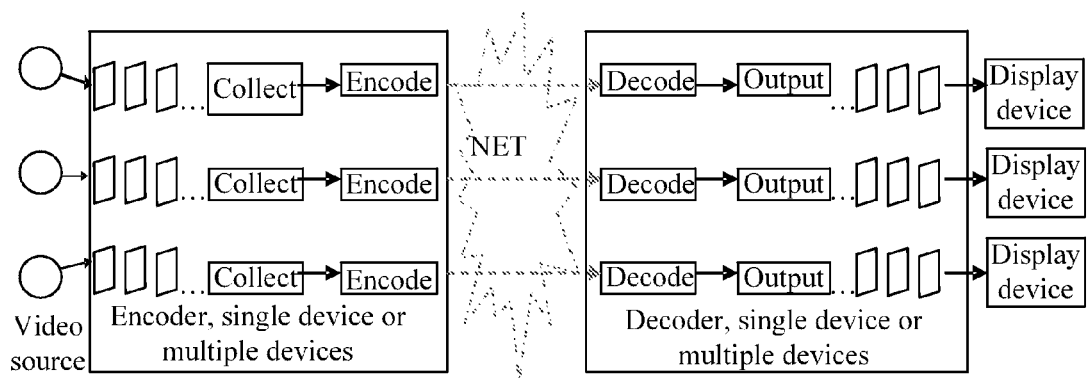
FIG. 3 is a schematic diagram of a process of video processing of multiple video streams in Embodiment 1 of a method for adjusting site bandwidth according to the present invention.

FIG. 1 is a flowchart of Embodiment 1 of a method for adjusting site bandwidth according to the present invention. As shown in FIG. 1, the embodiment provides a method for adjusting site bandwidth. The method may be specifically applied in a conference process at a multi-screen site. FIG. 2 is a schematic diagram of a multi-screen site in Embodiment 1 of a method for adjusting site bandwidth according to the present invention. As shown in FIG. 2, generally, camera 1, video conferencing terminal 1, display 1, and user area 1 are in a first group of corresponding relationships; camera 2, video conferencing terminal 2, display 2, and user area 2 are in a second group of corresponding relationships; and camera 3, video conferencing terminal 3, display 3, and user area 3 are in a third group of corresponding relationships. Video conferencing terminals 1, 2, and 3 may also be implemented by one conferencing terminal as long as the conferencing terminal is capable of encoding and decoding multiple video streams. FIG. 3 is a schematic diagram of a process of video processing of multiple video streams in Embodiment 1 of a method for adjusting site bandwidth according to the present invention. As shown in FIG. 3, the process corresponds to the application scenario of the multi-screen site shown in FIG. 2. In the embodiment, an $n^{th}$ stream may also be referred to as an $n^{th}$ screen stream, and a single stream or multiple streams may also be referred to as a single-screen stream or multi-screen streams. The embodiment may include the following steps:

Step 101: Obtain the number of streams at a multi-screen site, and assign bandwidth to each stream according to preset total bandwidth of multiple streams, maximum bandwidth of a single stream, and a preset bandwidth assignment method.

The multi-screen site in the embodiment may be similar to the site shown in FIG. 2 above. The embodiment is directed to bandwidth adjustment for each stream at a multi-screen site, and the streams are specifically video streams. This is not repeated hereinafter. The method for adjusting site bandwidth in the embodiment may specifically include a conference setup process and a conference adjustment process. Step 101 is a conference setup process. For a call process at the multi-screen site, in addition to a call procedure, the most important process is a process of negotiating a conference attribute. The negotiation is mainly categorized into point-to-point negotiation and multipoint negotiation. The content of negotiation may include the number of streams, audio protocol, video format, video bandwidth, audio bandwidth, and other parameters. The content is basically consistent for the point-to-point negotiation and multipoint negotiation.

Figure 4:
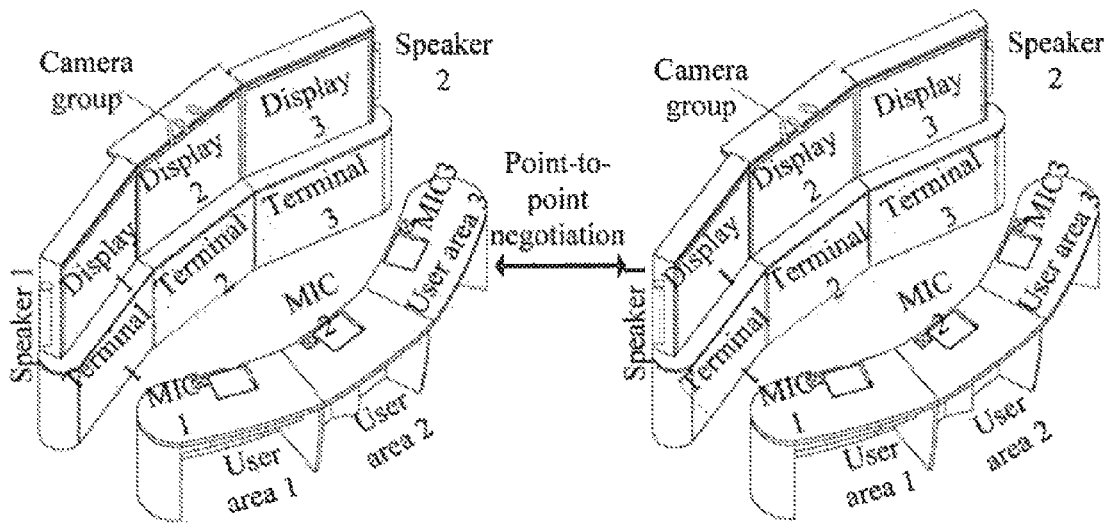
FIG. 4 is a schematic diagram of point-to-point negotiation in Embodiment 1 of a method for adjusting site bandwidth according to the present invention.
Figure 5:
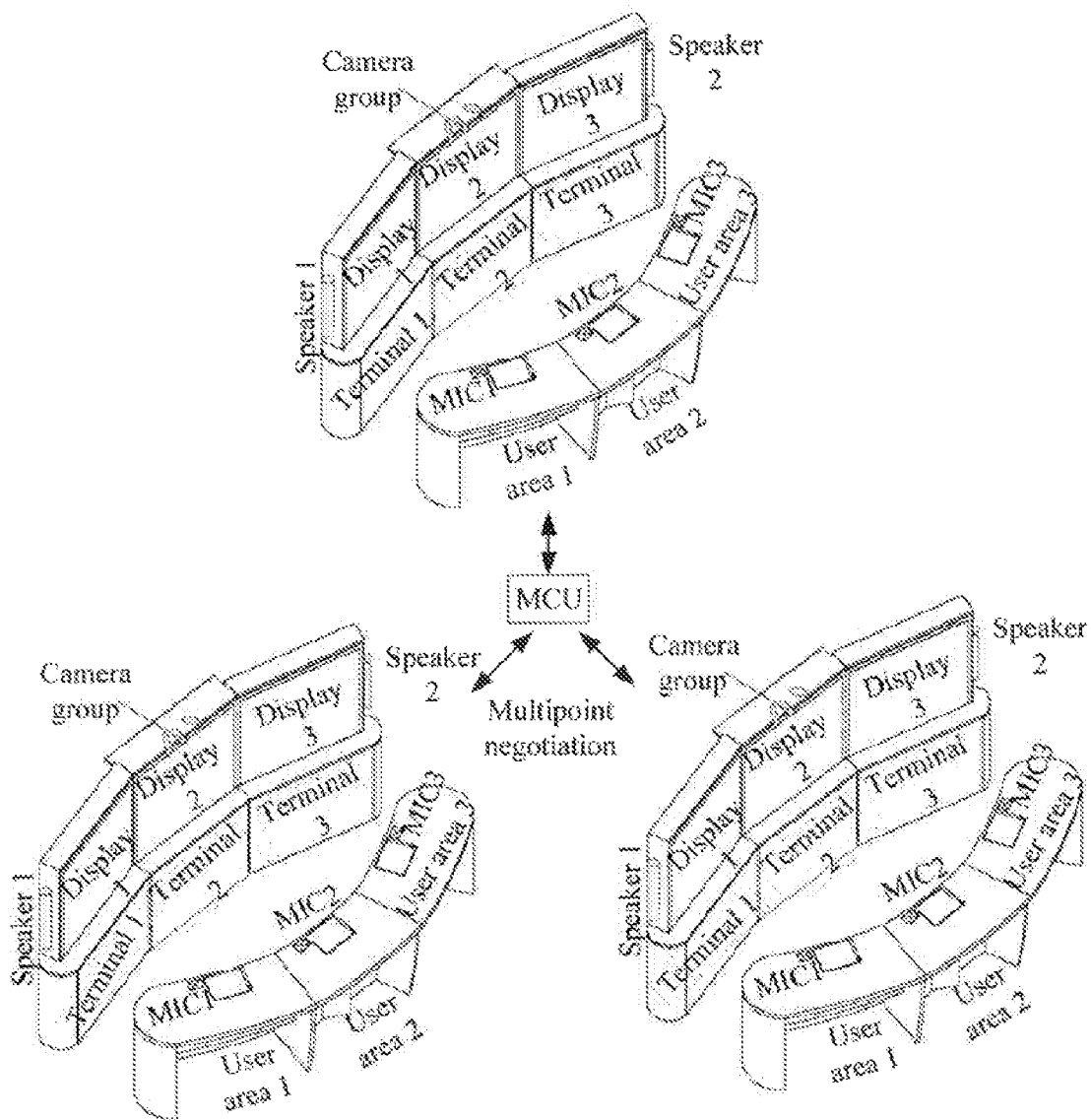
FIG. 5 is a schematic diagram of multipoint negotiation in Embodiment 1 of a method for adjusting site bandwidth according to the present invention.

FIG. 4 and FIG. 5 are a schematic diagram of point-to-point negotiation and a schematic diagram of multipoint negotiation in Embodiment 1 of a method for adjusting site bandwidth according to the present invention, respectively. The point-to-point negotiation is a process in which a conference is directly convened between two multi-screen sites and both parties use an independent network channel to negotiate conference parameters. The multipoint negotiation is a process in which a conference is convened among multiple multi-screen sites through a third-party device such as a media control server (for example, a frequently used multipoint control unit (MCU)), a server, and a media gateway, and each multi-screen site negotiates conference parameters with the third-party device. In the conference setup process in the embodiment, the number of streams, total bandwidth of multiple streams, and maximum bandwidth of a single stream are obtained by negotiation. Herein, the preset number of streams is the number of streams obtained by negotiation. Herein, the total bandwidth of multiple streams and maximum bandwidth of a single stream are bandwidth values to be satisfied in subsequent bandwidth adjustment. In the embodiment, a video stream is used as an example of a stream for description. Therefore, the number of streams joining a conference is specifically the number n of video streams, the total bandwidth of multiple streams is specifically the total bandwidth of multiple videos VidTotalBR, and the maximum bandwidth of a single stream is specifically the maximum bandwidth of a single video MaxSingleBR.

The bandwidth assignment method in the embodiment may include, but is not limited to, an average assignment method and a weighted assignment method, which may be described in detail in subsequent embodiments. Specifically, bandwidth is assigned to each stream by using an average assignment method or a weighted assignment method according to preset total bandwidth of multiple streams and maximum bandwidth of a single stream. Corresponding bandwidth assigned to each stream by using the average assignment method is an average value of the total bandwidth of multiple streams, and corresponding bandwidth assigned to each stream by using the weighted assignment method is a product of the total bandwidth of multiple streams and a weighting coefficient corresponding to the each stream. A sum of the bandwidth corresponding to the streams is smaller than or equal to the total bandwidth of multiple streams, and a maximum bandwidth value in the bandwidth corresponding to the streams is smaller than or equal to the maximum bandwidth of a single stream. In this step, a preset bandwidth assignment method is used to assign bandwidth to each preset stream at the multi-screen site, that is, after the multi-screen site joins the conference, resources are assigned to a stream corresponding to each screen, so that bandwidth corresponding to each single screen is determined. When bandwidth is assigned to each video stream, formulas (1) and (2) should be specifically satisfied:

$$\sum_{i=0}^{n} VidBRi \le VidTotalBR; \qquad (1)$$

$$\max(VidBR0, VidBR1, \ldots, VidBRn) \le MaxSingleBR; \qquad (2)$$

Formula (1) indicates that the sum of bandwidth of multiple video streams should not exceed the total bandwidth of multiple videos, and formula (2) indicates that the bandwidth of a single video stream should not exceed the maximum bandwidth of a single video.

Step 102: Obtain a conference joining state of each stream, and adjust bandwidth of each stream according to the conference joining state of each stream.

In the process of convening the conference, bandwidth of each stream is adjusted according to the conference joining state, obtained by detection, of each stream. In the conference process, all previous conference joining states of the streams may not be normal. In the embodiment, the obtained conference joining state of a stream may include normally joined, statically joined, and unjoined. A stream in the normally joined state joins the conference normally, and there is an actual participant. A stream in the statically joined state joins the conference normally, but there is no actual participant, and the screen corresponding to the stream always displays a still image. A stream in the unjoined state does not join the conference normally, and a receiver may not receive the stream, and the corresponding screen is in a blank screen state. In this step, a conference joining state of each stream is obtained by detection, and bandwidth of all streams is adjusted according to the conference joining states of the streams. When a stream or some streams at the multi-screen site are in the normally joined state in an initial conference setup phase but are in the unjoined state in the conference process, the bandwidth of the stream(s) may be adjusted to 0, and the bandwidth originally assigned to the stream(s) may be reassigned to other streams. Alternatively, when a stream or some streams at the multi-screen site are in the unjoined state in the initial conference setup phase but are in the normally joined state in the conference process, that is, some streams join the multi-screen site, overall adjustment may be made to the bandwidth of all streams, so that new streams also obtain corresponding bandwidth.

Specifically, in the embodiment, when a conference joining state of each stream is obtained, whether each stream joins the conference may be determined according to transmission of the stream at the multi-screen site; when a stream is not received by the receiver, the conference joining state of the stream is determined as unjoined; when a stream is received by the receiver, change of the stream may be detected, and when change of content of the stream is detected, the conference joining state of the stream is determined as normally joined; and when no change of content of the stream is detected, the conference joining state of the stream is determined as statically joined.

With the method for adjusting site bandwidth according to the embodiment, the number of streams at the multi-screen site is obtained, corresponding bandwidth is assigned to each stream at the multi-screen site according to preset total bandwidth of multiple streams, maximum bandwidth of a single stream, and a preset bandwidth assignment method, and in a conference process, bandwidth of each stream is adjusted according to the obtained conference joining state of each stream. The embodiment implements dynamic adjustment of bandwidth resources of each stream according to the actual condition of the conference, so that bandwidth resources of each site are fully utilized.

Figure 6:
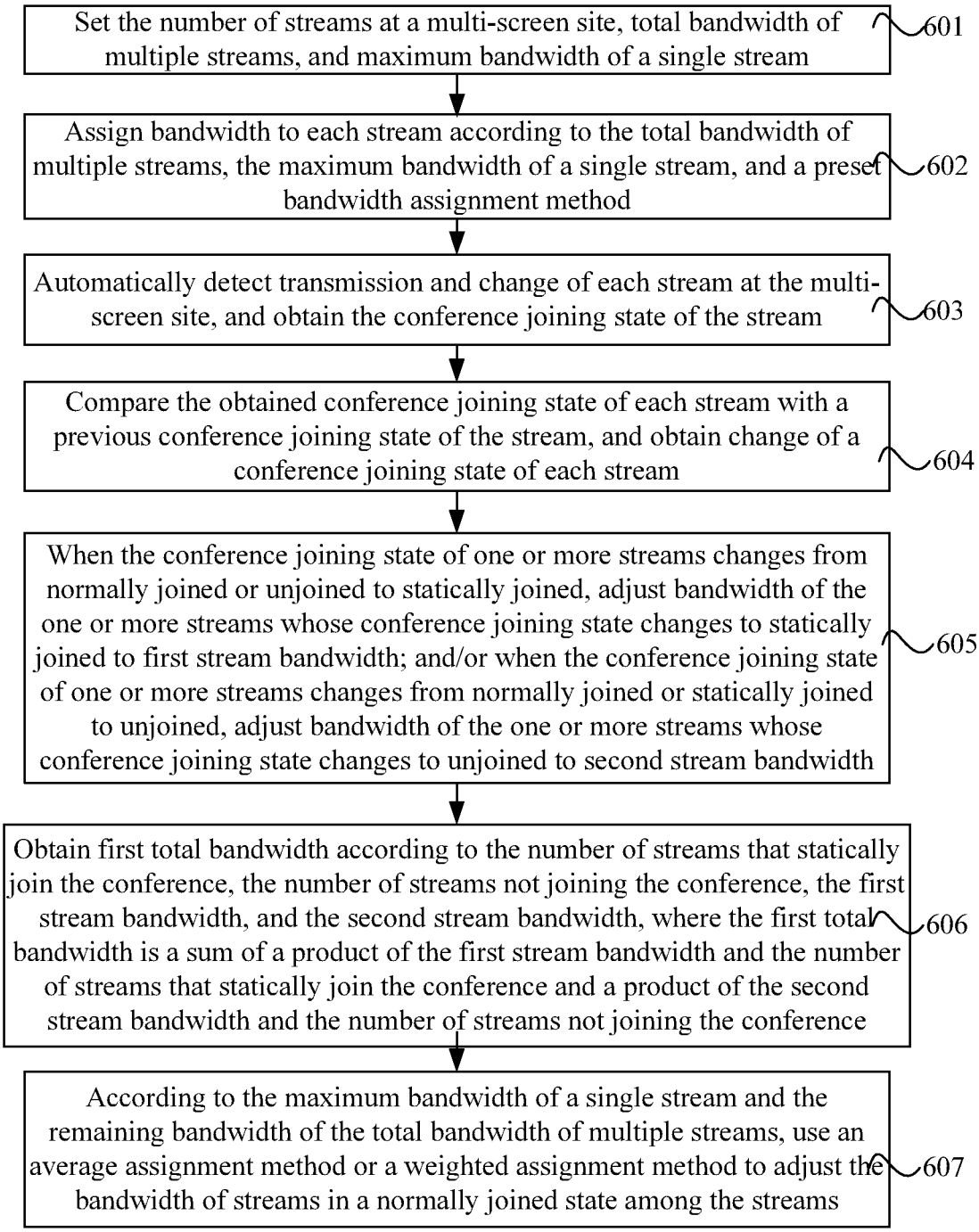
FIG. 6 is a flowchart of Embodiment 2 of a method for adjusting site bandwidth according to the present invention.

FIG. 6 is a flowchart of Embodiment 2 of a method for adjusting site bandwidth according to the present invention. As shown in FIG. 6, the embodiment provides a method for adjusting site bandwidth. The method may be specifically applied in a conference process at a multi-screen site. The method for adjusting site bandwidth according to the embodiment may include the following steps:

Step 601: Set the number of streams at a multi-screen site, total bandwidth of multiple streams, and maximum bandwidth of a single stream.

In the embodiment, first, parameters for joining a conference are negotiated between sites that join the conference, or between each site and an MCU, that is, the number of streams at a multi-screen site, total bandwidth of multiple streams, and maximum bandwidth of a single stream are set in this step. In the embodiment, a video stream is used as an example of a stream for description. Therefore, the number of streams is specifically the number n of video streams, the total bandwidth of multiple streams is specifically the total bandwidth of multiple videos VidTotalBR, and the maximum bandwidth of a single stream is specifically the maximum bandwidth of a single video MaxSingleBR. In the embodiment, it may be assumed that: the total bandwidth of multiple videos VidTotalBR is 6 Megabits per a second (Mbps), the maximum bandwidth of a single video MaxSingleBR is 4 Mbps, and the number n of video streams is 3.

Specifically, the embodiment may be applied in a video conferencing field that uses a session initiation protocol (SIP) for negotiation, or applied in a video conferencing field that uses an H.323 protocol for negotiation. With respect to the SIP protocol, in a conference setup process, parameters for describing the number of video streams at a site and the maximum bandwidth of a single video may be added in a standard document rfc2327.txt about media negotiation in the SIP protocol. Specifically, the description of related parameters in the standard document is as follows:

Media description
m=(media name and transport address)
i=* (media title)
c=* (connection information—optional if included at session-level)
b=* (bandwidth information)
k=* (encryption key)
a=* (zero or more media attribute lines)
n* (max channel number)
x=* (max bandwidth in one channel)

where, "n=* (max channel number)" and "x=* (max bandwidth in one channel)" are new parameter descriptions, which represent the number of streams and the maximum bandwidth of a single stream, respectively, while the total bandwidth of multiple streams may be described by using the original "b=* (bandwidth information)" in the standard document.

With respect to the H.323 protocol, in the conference setup process, corresponding parameter description may be added in the H.245 standard document published by the International Telecommunication Unit (ITU). Specific description is as follows:

```
H261VideoCapability    ::=SEQUENCE
{
qcifMPI                INTEGER (1..4) OPTIONAL,-- units 1/29.97 Hz
cifMPI                 INTEGER (1..4) OPTIONAL,-- units 1/29.97 Hz
temporalSpatialTradeOffCapability BOOLEAN,
maxBitRate             INTEGER (1..19200), -- units of
                                           -- 100 bit/s
stillImageTransmission BOOLEAN,    -- Annex D/H.261
...,
videoBadMBsCap BOOLEAN
maxChannelNumber       INTEGER
maxTotalBitRate        INTEGER (1..19200), -- units of
                                           -- 100 bit/s
}
``` where, "maxChannelNumber" and "maxTotalBitRate" are new parameter descriptions, which indicate the number of streams and the total bandwidth of multiple streams, respectively, while the maximum bandwidth of a single stream may be described by using the original "maxBitRate" in the standard document.

In addition, corresponding parameter description is added in the following content in the H.245 standard document published by the ITU.

```
H263VideoCapability    ::=SEQUENCE
{
sqcifMPI           INTEGER (1..32) OPTIONAL, -- units 1/29.97 Hz
qcifMPI            INTEGER (1..32) OPTIONAL, -- units 1/29.97 Hz
cifMPI             INTEGER (1..32) OPTIONAL, -- units 1/29.97 Hz
cif4MPI            INTEGER (1..32) OPTIONAL, -- units 1/29.97 Hz
cif16MPI           INTEGER (1..32) OPTIONAL, -- units 1/29.97 Hz
maxBitRate INTEGER (1..192400),-- units 100 bit/s
maxChannelNumber INTEGER
maxTotalBitRate    INTEGER (1..19200), -- units of 100 bit/s
unrestrictedVector BOOLEAN,
arithmeticCoding BOOLEAN,
advancedPrediction     BOOLEAN,
pbFrames           BOOLEAN,
temporalSpatialTradeOffCapability    BOOLEAN,
hrd-B              INTEGER (0..524287) OPTIONAL, -- units 128 bits
bppMaxKb           INTEGER (0..65535) OPTIONAL, -- units 1024 bits
...,
slowSqcifMPI  INTEGER (1..3600) OPTIONAL, -- units seconds/frame
slowQcifMPI   INTEGER (1..3600) OPTIONAL, -- units seconds/frame
slowCifMPI    INTEGER (1..3600) OPTIONAL, -- units seconds/frame
slowCif4MPI INTEGER (1..3600) OPTIONAL, -- units seconds/frame
slowCif16MPI INTEGER (1..3600) OPTIONAL, --units seconds/frame
errorCompensation      BOOLEAN,
enhancementLayerInfo   EnhancementLayerInfo OPTIONAL,
h263Options       H263Options OPTIONAL
}
``` where, "maxChannelNumber" and "maxTotalBitRate" are new parameter descriptions, which indicate the number of streams and the total bandwidth of multiple streams, respectively, while the maximum bandwidth of a single stream may be described by using the original "maxBitRate" in the standard document.

In addition, parameter description is added in the following content in Table 2/H.241 H.241 capability identifier in section 8.3.2.1 in the H.245 standard document published by the ITU.

TABLE 2

| H.241 H.264 Capability Identifier | |
|---|---|
| Capability name | ITU-T Rec. H.241 H.264 Video Capabilities |
| Capability identifier type | standard |
| Capability identifier value | {itu-t(0) recommendation(0) h(8) 241 specificVideoCodecCapabilities(0) h264(0) generic-capabilities(1)} |
| maxBitRate | This field shall be included, in units of 100 bit/s |
| collapsing | This field shall contain the H.264 Capability Parameters as given below. |
| nonCollapsing | This field shall not be included. |
| nonCollapsingRaw | This field shall not be included. |
| transport | This field shall not be included |
| maxChannelNumber | This field shall be included |
| maxTotalBitRate | This field shall be included, in units of 100 bit/s | where, "maxChannelNumber" and "maxTotalBitRate" are new parameter descriptions, which indicate the number of streams and the total bandwidth of multiple streams, respectively, while the maximum bandwidth of a single stream may be described by using the original "maxBitRate" in the standard document.

Step 602: Assign bandwidth to each stream according to the total bandwidth of multiple streams, the maximum bandwidth of a single stream, and a preset bandwidth assignment method.

After the negotiation and setting of each parameter for joining the conference are complete, a preset bandwidth assignment method is used in this step to assign bandwidth to each stream, that is, assign bandwidth to three video streams. When bandwidth is assigned to each video stream, formulas (3) and (4) should be specifically satisfied:

$$\begin{cases} (A\_VidBR0 + A\_VidBR1 + A\_VidBR2) \le VidTotalBR \\ (B\_VidBR0 + B\_VidBR1 + B\_VidBR2) \le VidTotalBR \end{cases} \quad (3)$$

$$\begin{cases} \max(A\_VidBR0, A\_VidBR1, A\_VidBR2) \le MaxSingleBR \\ \max(B\_VidBR0, B\_VidBR1, B\_VidBR2) \le MaxSingleBR \end{cases} \quad (4)$$

The embodiment uses an example that a conference is convened between multi-screen site A and multi-screen site B for description, where, A_VidBR0, A_VidBR1, and A_VidBR2 represent bandwidth of three video streams at multi-screen site A, respectively, and B_VidBR0, B_VidBR1, and B_VidBR2 represent bandwidth of three video streams at multi-screen site B, respectively. When an average assignment method is used to assign bandwidth, bandwidth assigned to each video stream in the preceding example is VideoBR0=VideoBR1=VideoBR2=2 Mbps. When a weighted assignment method is used to assign bandwidth, it is assumed that weighting coefficients corresponding to the three video streams at the multi-screen site are C0, C1, and C2, respectively, bandwidth corresponding to each video stream is obtained as a product of the total bandwidth of multiple streams and the weighting coefficient corresponding to the video stream. To be specific, the bandwidth of the first video stream at the multi-screen site is VideoBR0=VidTotalBR*C0=6 Mbps*C0, the bandwidth of the second video stream at the multi-screen site is VideoBR1=VidTotalBR*C1=6 Mbps*C1, and the bandwidth of the third video stream at the multi-screen site is VideoBR2=VidTotalBR*C2=6 Mbps*C2, where, the sum of the weighting coefficients (C0+C1+C2) is smaller than or equal to 1. A weighting coefficient corresponding to each video stream may be set according to an actual condition, or set to an empirical value, and different bandwidth may be set for video streams by setting different weighting coefficients.

Step 603: Automatically detect transmission and change of each stream at the multi-screen site, and obtain the conference joining state of the stream.

In the process of convening the conference, the conference joining state of a stream at the multi-screen site may change. In this step, transmission and change of each stream are detected automatically, and the current conference joining state of the stream is obtained. Specifically, whether each stream joins the conference may be determined according to the transmission of the stream at the multi-screen site. When a stream is not received, it indicates that the stream is currently in an unjoined state, and therefore the conference joining state of the stream is determined as unjoined. When a stream is received, change of the stream may be further detected. Specifically, a motion detection method or an intelligent detection method may be used to detect the change of the stream. When it is detected that content of the stream, namely, an image on a screen corresponding to the stream, does not change in a current time segment, the conference joining state of the stream is determined as statically joined. When a stream is received, and it is further detected that content of the stream changes, that is, an image on a screen corresponding to the stream changes in the current time segment, the conference joining state of the stream is determined as normally joined.

Specifically, when change of each video stream at the multi-screen site is detected in this step, change of an image on each screen at the multi-screen site may be detected automatically by video signal processing at an encoding transmitter. The specific detection method includes, but is not limited to, a motion detection method and an intelligent detection method. With respect to the motion detection method, if a still picture is maintained on a screen corresponding to a video stream within a set time segment T1, it indicates that there is no participant on the screen, that is, the video stream corresponding to the screen is in a statically joined state; otherwise, the video stream corresponding to the screen is in a normally joined state. With respect to the intelligent detection method, for example, a face recognition algorithm, if no face area is detected on a screen corresponding to a video stream within a set time segment T2, it indicates that the video stream is in the statically joined state; otherwise, the video stream is in the normally joined state. The intelligent detection method is not limited to the face recognition algorithm and may also be an object recognition algorithm such as iris detection.

Step 604: Compare the obtained conference joining state of each stream with a previous conference joining state of the each stream, and obtain change of a conference joining state of each stream.

Through the detection process in step 603 above, a conference joining state of each stream at the multi-screen site may be detected. However, in a conference process, a conference joining state of each stream may change, including the change from a normally joined state to a statically joined state or an unjoined state, change from a statically joined state to a normally joined state or an unjoined state, and the change from an unjoined state to a normally joined state or a statically joined state. In the embodiment, when one or more streams changes, it is necessary to adjust bandwidth of each stream at the multi-screen site to adapt to a new conference scenario. In this step, the obtained conference joining state of each stream is compared with the corresponding previous conference joining state of the each stream, and change of a conference joining state of each stream is obtained. With respect to the specific change of the conference joining state, a conference joining state of each stream may be detected according to step 603 above, and the change of the conference joining state is obtained according to different detection results.

Step 605: When the conference joining state of one or more streams among the streams changes from normally joined or unjoined to statically joined, adjust bandwidth of the one or more streams whose conference joining state changes to statically joined among the streams to first stream bandwidth; and/or when the conference joining state of one or more streams among the streams changes from normally joined or statically joined to unjoined, adjust bandwidth of the one or more streams whose conference joining state changes to unjoined among the streams to second stream bandwidth.

In this step, the bandwidth of a stream whose conference joining state changes to statically joined or unjoined is specifically set first. In the embodiment, a bandwidth value may be set for a stream in the statically joined state or unjoined state. Herein, the bandwidth of a stream in the statically joined state is first stream bandwidth VidBR1, and the bandwidth of a stream in the unjoined state is second stream bandwidth VidBR2. The second stream bandwidth may be specifically 0 Mbps, that is, bandwidth resources previously assigned to a video stream that actually does not join the conference are cancelled. In this step, when one or more streams whose conference joining state changes from normally joined to statically joined among the streams, and/or when one or more streams whose conference joining state changes from unjoined to statically joined among the streams, the bandwidth of the one or more streams whose conference joining state changes to statically joined is adjusted to the first stream bandwidth; and/or, when one or more streams whose conference joining state changes from normally joined to unjoined among the streams, and/or when one or more streams whose conference joining state changes from statically joined to unjoined among the streams, the bandwidth of the one or more streams whose conference joining state changes to unjoined is adjusted to the second stream bandwidth.

After the one or more streams whose conference joining state changes is obtained and the bandwidth of the one or more streams whose conference joining state changes to unjoined and/or statically joined is adjusted through the preceding steps, the number of streams in various joining states at the multi-screen site is counted. To be specific, the number of streams currently in the statically joined state is obtained as the number of streams that statically join the conference, and the number of streams currently in the unjoined state is obtained as the number of streams that do not join the conference.

Step 606: Obtain first total bandwidth according to the number of streams that statically join the conference, the number of streams that do not join the conference, the first stream bandwidth, and the second stream bandwidth, where the first total bandwidth is a sum of a product of the first stream bandwidth and the number of streams that statically join the conference and a product of the second stream bandwidth and the number of streams that do not join the conference.

In this step, the first total bandwidth is obtained according to the preceding count result and adjustment result. To be specific, the total bandwidth of stream(s) in the statically joined state and stream(s) in the unjoined state is obtained. The first total bandwidth obtained by calculation herein is the sum of the product of the first stream bandwidth and the number of streams that statically join the conference and the product of the second stream bandwidth and the number of streams that do not join the conference, that is, the bandwidth of all streams in the statically joined state and the bandwidth of all streams in the unjoined state are accumulated for processing. In the embodiment, the number of streams that statically join the conference is the number of streams currently in the statically joined state among the streams, and the number of streams that do not join the conference is the number of streams currently in the unjoined state. To be specific, in the embodiment, the following formula (5) may be used to obtain the first total bandwidth VidTotalBR1:

$$VidTotalBR1 = VidBR1 * n1 + VidBR2 * n2 \quad (5)$$

where, n1 indicates the number of streams in the statically joined state, and n2 indicates the number of streams in the unjoined state.

Step 607: According to the maximum bandwidth of a single stream and the remaining bandwidth, use an average assignment method or a weighted assignment method to adjust the bandwidth of streams in the normally joined state among the streams.

When the conference joining state of a stream in the conference process changes and after the bandwidth of the streams in the statically joined state and the bandwidth of the streams in the unjoined state are set and adjusted, this step is performed to readjust the bandwidth of the streams in the normally joined state at the multi-screen site. Specifically, according to the total bandwidth of multiple streams and the remaining bandwidth, where the remaining bandwidth may be the difference between the total bandwidth of multiple streams and the first total bandwidth, namely, according to the difference between the total bandwidth of multiple videos and the first total video stream bandwidth (VidTotalBR−VidTotalBR1) and the maximum bandwidth of a single video MaxSingleBR, the bandwidth of other video streams in the normally joined state may be readjusted by using the average assignment method or weighted assignment method described in the preceding steps. As can be seen that, by using the method provided by the embodiment, when the conference joining state of a video stream at the multi-screen site changes, after the bandwidth is readjusted, bandwidth resources may be fully utilized, so that the bandwidth of other video streams joining the conference is increased.

Alternatively, in the embodiment, the technical solution may be implemented by using a detection and manual adjustment method by a conference administrator or a participant. In the process of convening the conference, when a participant finds that there is no actual participant on a screen at the multi-screen site, the participant manually readjusts the bandwidth of a video stream corresponding to the screen and synchronously adjusts bandwidth resources of video streams corresponding to other screens at the same site according to the adjustment result, where the readjusted bandwidth should satisfy the preceding formulas (1) and (2). In this way, bandwidth resources may be fully readjusted, and assigned to video streams corresponding to screens that really need to consume bandwidth. For example, if no actual participant is found on a $0^{th}$ screen, the bandwidth resource of a video stream corresponding to the screen is readjusted to VideoBR0'=0 Mbps, and according to the adjustment result of the $0^{th}$ screen, bandwidth of video streams corresponding to two other screens is adjusted synchronously. The bandwidth of the video streams corresponding to the two other screens may be set to VideoBR1'=VideoBR2'=3 Mbps according to the average assignment method. Bandwidth may also be assigned to the remaining screens, namely, a first screen and a second screen, according to a weighted assignment method. Bandwidth of each screen is as follows: The bandwidth of the first video stream is adjusted to VideoBR0'=0 Mbps; the bandwidth of the second video stream is adjusted to VideoBR1'=VidTotalBR*C1'=6 Mbps*C1'; and the bandwidth of the third video stream is adjusted to VideoBR2'=VidTotalBR*C2'=6 Mbps*C2', where, (C1'+C2')<=1.0.

Alternatively, in the embodiment, the bandwidth of streams specified by various joining states may be set according to the actual condition of the conference by using a flexible bandwidth configuration method. After it is determined that the conference joining state of a stream changes, the bandwidth of the stream may be adjusted according to the changed conference joining state of the stream, so that bandwidth of each stream may be adjusted according to the actual condition of the stream in the conference process. Specifically, the bandwidth of a stream in the statically joined state may be set to first stream bandwidth VidBR1, the bandwidth of a stream in the unjoined state may be set to second stream bandwidth VidBR2, and the bandwidth of a stream in the normally joined state may be set to third stream bandwidth VidBR3. The first stream bandwidth VidBR1 is greater than the second stream bandwidth VidBR2, and the third stream bandwidth VidBR3 is greater than the first stream bandwidth VidBR1. Generally, the second stream bandwidth VidBR2 may be set to 0; therefore, no video stream is sent, and for video processing of the screen, a receiver may have no output or may use a fixed picture that is locally set. The first stream bandwidth VidBR1 is set to a very small bandwidth value so long as this bandwidth value can ensure transmission of a still picture. A transmitter may use this bandwidth value to send static background information to the receiver or send a specified still picture. After receiving the still picture, the receiver may output and display the still picture or output other still pictures that are locally set.

With the method for adjusting site bandwidth according to the embodiment, the number of streams at the multi-screen site is obtained, corresponding bandwidth is assigned to each stream at the multi-screen site according to preset total bandwidth of multiple streams, maximum bandwidth of a single stream, and a preset bandwidth assignment method, and in a conference process, bandwidth of each stream is adjusted according to the obtained conference joining state of each stream. The embodiment implements dynamic adjustment of bandwidth resources of each stream according to the actual condition of the conference, so that bandwidth resources of each site are fully utilized.

Figure 7:
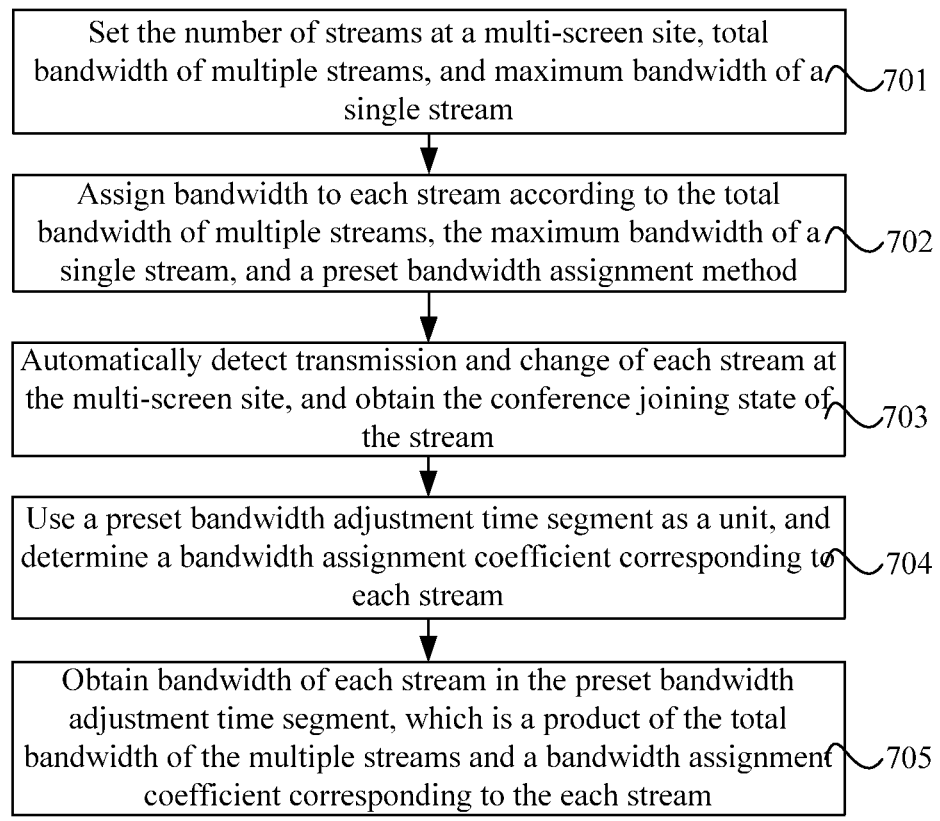
FIG. 7 is a flowchart of Embodiment 3 of a method for adjusting site bandwidth according to the present invention.

FIG. 7 is a flowchart of Embodiment 3 of a method for adjusting site bandwidth according to the present invention. As shown in FIG. 7, the embodiment provides a method for adjusting site bandwidth. The method may be specifically applied in a conference process at a multi-screen site. The method for adjusting site bandwidth according to the embodiment may include the following steps:

Step 701: Set the number of streams at a multi-screen site, total bandwidth of multiple streams, and maximum bandwidth of a single stream. This step may be similar to step 601 above and is not described herein.

Step 702: Assign bandwidth to each stream according to the total bandwidth of multiple streams, the maximum bandwidth of a single stream, and a preset bandwidth assignment method. This step may be similar to step 602 above and is not described herein.

Step 703: Automatically detect transmission and change of each stream at the multi-screen site, and obtain the conference joining state of the stream. This step may be similar to step 603 above and is not described herein.

Step 704: Use a preset bandwidth adjustment time segment as a unit, and determine a bandwidth assignment coefficient corresponding to each stream.

In the embodiment, during bandwidth adjustment, a dynamic adjustment method is used. A bandwidth adjustment time segment T3 is set and used as a unit, and a bandwidth assignment coefficient corresponding to each group is determined for each stream. The stream in the embodiment is specifically a video stream. It is assumed that the bandwidth assignment coefficient corresponding to an $n^{th}$ video stream is CT3_n. In the embodiment, a bandwidth assignment coefficient corresponding to each video stream should satisfy the following formula (6):

$$\sum_{0}^{N-1} CT3\_n \leq 1.0 \qquad (6)$$

In the embodiment, the minimum unit of the preset bandwidth adjustment time segment T3 may be up to an interval between adjacent frames of an image in a video, that is, bandwidth adjustment may be processed in real time as per frame, and bandwidth assignment coefficients of frames may be inconsistent. In the embodiment, the manner of determining a bandwidth assignment coefficient CT3_n corresponding to each video stream may be a manual determining manner or an automatic determining manner. Normally, the automatic determining manner may be a video image detection method. Specifically, a unified operation may be performed according to image picture complexity change in combination with picture complexity change of all screens to obtain CT3_n by calculation. Herein, a simple picture complexity change method is used as an example to describe the preceding process. With respect to the change of picture complexity of an $x^{th}$ frame image of a video stream corresponding to an $n^{th}$ screen, it is necessary to calculate the change between the $x^{th}$ frame image and the $(x-1)^{th}$ frame image. Generally, in image processing, absolute differences and a sum of absolute differences (SAD) are used to express the change, where the SAD is the sum of absolute pixel differences corresponding to each pixel in two frame images. Therefore, in the embodiment, the process of calculating a bandwidth assignment coefficient CT3_nx corresponding to each video stream may include the following steps: First, the SAD value of the $x^{th}$ frame image of a video stream corresponding to each screen is calculated. It is assumed that the SAD value of the $x^{th}$ frame image is SAD_nx. Next, the sum of SAD values of the $x^{th}$ frame of a video stream corresponding to each screen is obtained by calculation, that is, Total-SAD_x=(SAD_0x+SAD_1x+ . . . +SAD_nx). Then, the bandwidth assignment coefficient corresponding to the $x^{th}$ frame image of a video stream corresponding to each screen is obtained by calculation, that is, CT3_nx=SAD_nx/Total-SAD_x.

Step 705: Obtain bandwidth of each stream in the preset bandwidth adjustment time segment, which is a product of the total bandwidth of multiple streams and a bandwidth assignment coefficient corresponding to the each stream, where a sum of the bandwidth assignment coefficients corresponding to the streams is smaller than or equal to 1.

After the bandwidth of each video stream in the preset bandwidth adjustment time segment is obtained by calculation, bandwidth of each video stream may be obtained according to the bandwidth, and specifically, may be obtained by calculation by using the following formula (7):

$$VideoBR\_n = (CT3\_n * VidTotalBR) \qquad (7)$$

where, VideoBR_n indicates the bandwidth of a $n^{th}$ video stream, VidTotalBR indicates the total bandwidth of multiple videos, and CT3_n indicates the bandwidth assignment coefficient corresponding to the $n^{th}$ video stream. Therefore, bandwidth of each video stream is obtained by calculation as follows:

bandwidth of a first video stream: $VideoBR0x =$ $$VidTotalBR * CT3\_0x \ Mbps;$$

bandwidth of a second video stream: $VideoBR1x =$ $$VidTotalBR * CT3\_1x \ Mbps;$$

...

bandwidth of a $n^{th}$ video stream $VideoBRnx =$ $$VidTotalBR * CT3\_nx \ Mbps;$$

In the embodiment, considering similarity of real-time video images in terms of time, a prediction method may also be used to obtain a SAD value to simplify the processing procedure. For example, the SAD value of the $(x-1)^{th}$ frame is used to predict the SAD value of the $x^{th}$ frame. General prediction methods include a direct citation method, a linear derivation method, and a model prediction method. These methods may be used to predict the SAD value of the $x^{th}$ frame to simplify the processing procedure, thereby fulfilling a real-time processing requirement.

With the method for adjusting site bandwidth according to the embodiment, corresponding bandwidth is assigned to each video stream at the multi-screen site, and in a conference process, bandwidth of each video stream is adjusted according to the obtained conference joining state of each video stream, and the bandwidth is adjusted according to a continuous adjustment procedure. The embodiment implements dynamic adjustment of bandwidth resources of each stream according to the actual condition of the conference, so that bandwidth resources of each site are fully utilized.

Figure 8:
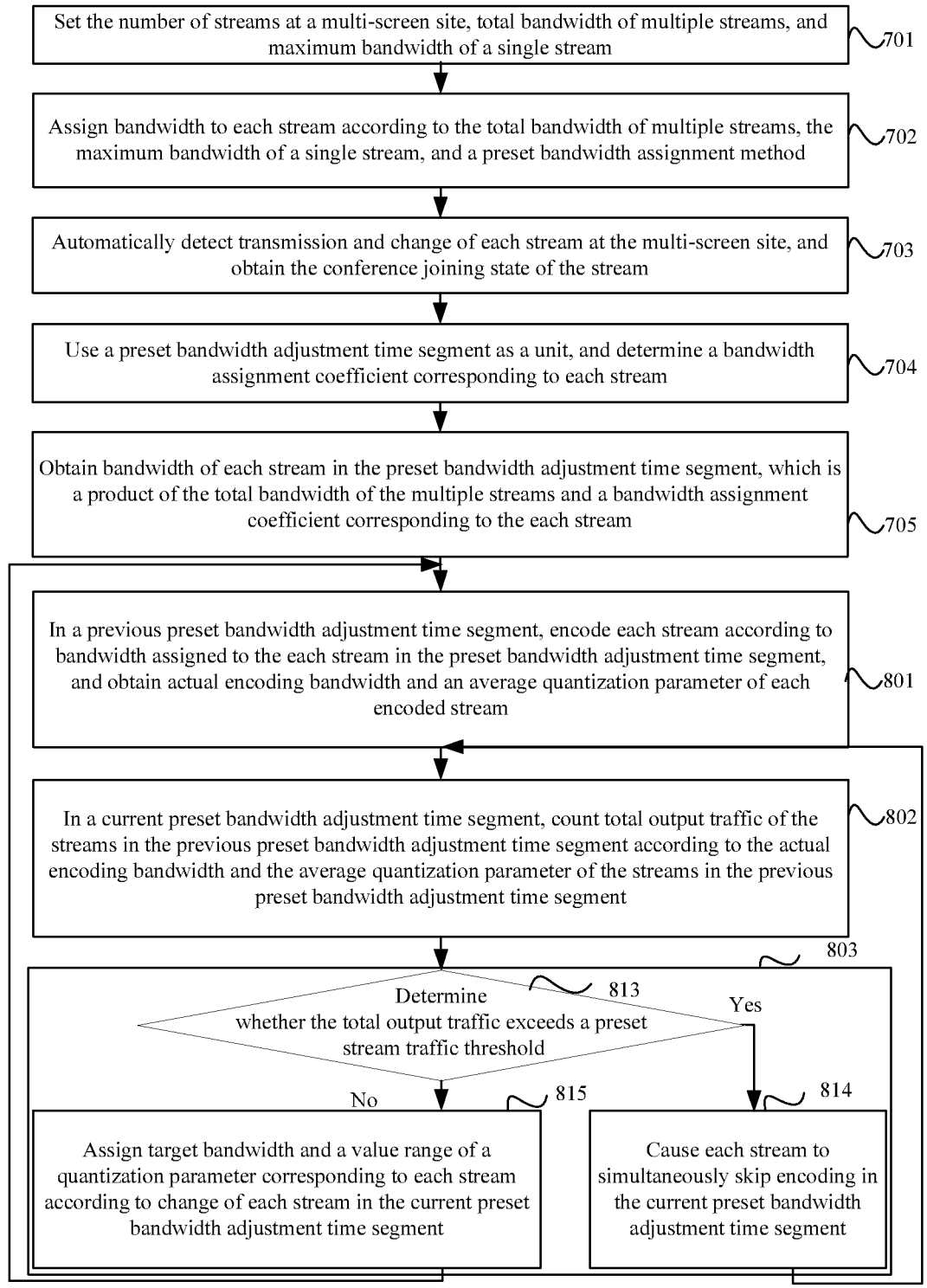
FIG. 8 is a flowchart of Embodiment 4 of a method for adjusting site bandwidth according to the present invention.

FIG. 8 is a flowchart of Embodiment 4 of a method for adjusting site bandwidth according to the present invention. As shown in FIG. 8, the embodiment provides a method for adjusting site bandwidth. On the basis of FIG. 7 above, the embodiment may further include the following steps:

Step 801: In a previous preset bandwidth adjustment time segment, encode each stream according to bandwidth assigned to the each stream in the preset bandwidth adjustment time segment, and obtain actual encoding bandwidth and an average quantization parameter of each encoded stream.

According to the embodiment, bandwidth of each stream in the previous preset bandwidth adjustment time segment may be determined. Herein, the preset bandwidth adjustment time segment may be specifically an interval between adjacent frames of an image. That is, the bandwidth of a multi-screen site having N screens is adjusted, and the bandwidth of an $x^{th}$ frame on an $i^{th}$ screen is determined as VideoBRix, where, i=1, 2, ..., N. In this step, each stream is encoded according to the determined bandwidth. In the encoding process, corresponding adjustment is made to a quantization parameter (QP) or frame rate in an encoder. The QP and frame rate are both parameters that affect image quality in video encoding. In the embodiment, to ensure basic consistency of image quality between the screens, that is, to ensure basic consistency of image quality of each stream on each screen in a time limit, after the encoding, actual encoding bandwidth and an average quantization parameter of each encoded stream are obtained. Herein, the actual encoding bandwidth is bandwidth corresponding to each stream, and the average quantization parameter may be an average value of QPs used in encoding the streams.

Step 802: In a current preset bandwidth adjustment time segment, count total output traffic of the streams in the previous preset bandwidth adjustment time segment according to the actual encoding bandwidth and the average quantization parameter of the streams in the previous preset bandwidth adjustment time segment.

After the actual encoding bandwidth and the average quantization parameter of each encoded stream are obtained in the preceding step, the total output traffic of the streams is counted according to the actual encoding bandwidth and the average quantization parameter, that is, the total output traffic of the streams in the previous preset bandwidth adjustment time segment is counted. Herein, the total output traffic may be total output traffic of the streams processed in the previous preset bandwidth adjustment time segment, and may specifically be the total traffic of the streams processed in the process of encoding a previous frame.

Step 803: Adjust target bandwidth and a quantization parameter or a frame rate of each stream in a current preset bandwidth adjustment time segment according to the total output traffic of the streams.

In this step, the target bandwidth and quantization parameter required for encoding a next frame of each stream in a next preset bandwidth adjustment time segment are adjusted according to the total output traffic obtained by the count, or the frame rate is adjusted. Herein, the frame rate may be the number of frames for encoding each stream that joins the conference. In this step, specifically, the magnitude of the total output traffic obtained by count may be determined, and the target bandwidth and quantization parameter are adjusted according to the determination result, or the frame rate is adjusted, so that consistency of the QPs of the screens or consistency of the frame rates of the screens is controlled, that is, a QP of each screen is adjusted to fall within a same value interval or a same variation policy is used for a frame rate of each screen. After the adjustment in this step is complete, the process further goes back to step 801 to perform the step of encoding a stream in a next time segment. In this way, bandwidth fluctuation caused by the limitation on a QP or frame rate in the embodiment may be eliminated, so that overall bandwidth of the streams is adjusted within the range of the total bandwidth.

Specifically, step 803 in the embodiment may specifically include the following steps:

Step 813: Determine whether the total output traffic exceeds a preset stream traffic threshold, and if so, perform step 814, or else, perform step 815.

After the total output traffic of the streams is obtained by count, whether the output total traffic exceeds the preset stream traffic threshold is determined. Herein, the stream traffic threshold may be set according to a bandwidth value. The purpose of determining the magnitude of the total output traffic in this step is to ensure that the stream traffic encoded per frame does not exceed the stream traffic that can be encoded at set bandwidth. When the total output traffic exceeds the preset stream traffic threshold, step 814 is performed; otherwise, step 815 is performed.

Step 814: Cause each stream to simultaneously skip encoding in the current preset bandwidth adjustment time segment, and go back to perform step 802.

When the counted total output traffic exceeds the preset stream traffic threshold, it indicates that the traffic of all streams is not processed completely in the encoding process of the previous bandwidth adjustment time segment. In this case, each stream simultaneously skips encoding in the current preset bandwidth adjustment time segment, that is, each screen synchronously skips a current frame without encoding, and the process goes back to perform step 802 to continue counting the total output traffic of a next frame, until the total output traffic does not exceed the preset stream traffic threshold. In this step, when the traffic of all streams is not processed completely in the encoding process in a previous frame, encoding in a next frame is not performed. In this way, transmission rate reduction caused by accumulated stream traffic that is not encoded may be avoided. By means of frame skipping, the pressure of encoding is mitigated, and the efficiency of data transmission is improved. In addition, in the embodiment, frame skipping is synchronously performed for the streams, that is, a frame rate of each screen is adjusted, so that consistency between frame rates of the screens may be ensured.

Step 815: Assign target bandwidth and a value range of a quantization parameter corresponding to each stream according to change of each stream in the current preset bandwidth adjustment time segment, and go back to perform step 801.

When the counted total output traffic does not exceed the preset stream traffic threshold, the target bandwidth and the value range of the QP corresponding to each stream in the current preset bandwidth adjustment time segment are assigned according to change of each stream in the current preset bandwidth adjustment time segment. Specifically, the bandwidth adjustment assignment manner in the Embodiment 3 may be specifically used as a target bandwidth assignment method, and a QP-SAD linear prediction manner may be used for predicting the value range of a QP. Herein, the SAD is obtained according to change of each stream in the current preset bandwidth adjustment time segment. The preset bandwidth adjustment time segment herein may be specifically an interval between adjacent frames of an image, and the obtaining manner in the Embodiment 3 may be specifically used as the method for obtaining the SAD. In this step, by counting a value of an average quantization parameter and a corresponding SAD value in each previous time segment, the relationship between the two may be fit to a linear fit curve. According to the linear fit curve, the QP value corresponding to the SAD value in a current time segment may be obtained, and then a QP range may be generated according to the obtained QP value. The generated QP range may be set to values near the QP value according to an actual condition.

With the method for adjusting site bandwidth according to the embodiment, after bandwidth of each stream is adjusted, the QP or frame rate for encoding each stream may be further adjusted. This solves the problem of inconsistency of image quality and frame rates between the streams, implements coordination between screens at the multi-screen site, and improves conference experience of participants.

Persons of ordinary skill in the art should understand that, all or part of the steps of the foregoing method embodiments may be implemented by a program instructing relevant hardware. The foregoing program may be stored in a computer readable storage medium. When the program is run, the foregoing steps included in the method embodiments are performed. The foregoing storage medium may be any medium capable of storing program codes, such as a read-only memory (ROM), a random-access memory (RAM), a magnetic disk, or an optical disk.

Figure 9:
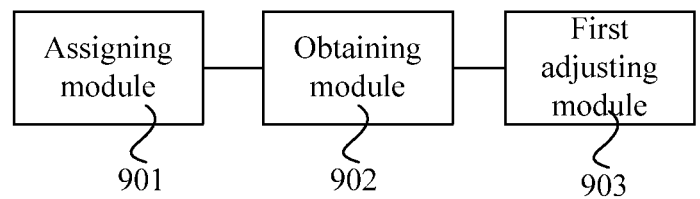
FIG. 9 is a schematic structural diagram of Embodiment 1 of an apparatus for adjusting site bandwidth according to the present invention.

FIG. 9 is a schematic structural diagram of Embodiment 1 of an apparatus for adjusting site bandwidth according to the present invention. As shown in FIG. 9, the embodiment provides an apparatus for adjusting site bandwidth, which may specifically perform each step of Embodiment 1 of the method above, and is not described herein. The apparatus for adjusting site bandwidth according to the embodiment is applicable to a conference process at a multi-screen site. The apparatus may specifically include an assigning module 901, an obtaining module 902, and a first adjusting module 903. The assigning module 901 is configured to obtain the number of streams at the multi-screen site, and assign bandwidth to each stream according to preset total bandwidth of multiple streams, maximum bandwidth of a single stream, and a preset bandwidth assignment method. The obtaining module 902 is configured to obtain a conference joining state of each stream. The first adjusting module 903 is configured to adjust bandwidth of each stream according to the obtained conference joining state of each stream.

Figure 10:
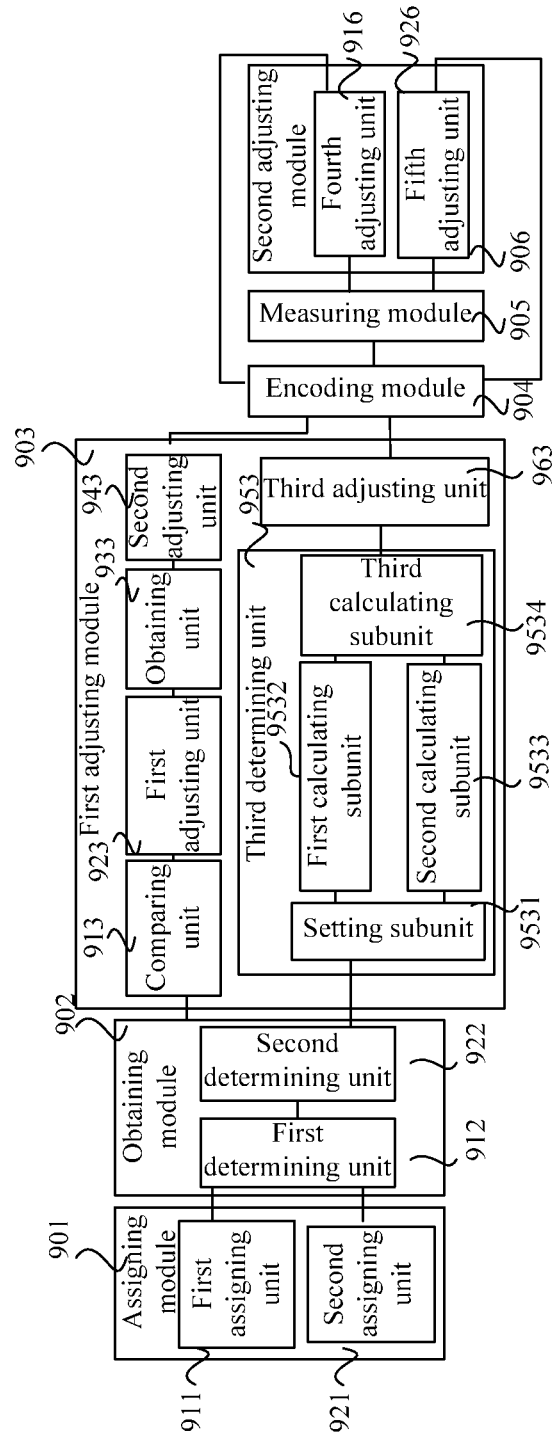
FIG. 10 is a schematic structural diagram of Embodiment 2 of an apparatus for adjusting site bandwidth according to the present invention.

FIG. 10 is a schematic structural diagram of Embodiment 2 of an apparatus for adjusting site bandwidth according to the present invention. As shown in FIG. 10, the embodiment provides an apparatus for adjusting site bandwidth, which may specifically perform each step of Embodiment 2 and Embodiment 3 of the method above, and is not described herein. In the apparatus for adjusting site bandwidth according to the embodiment, on the basis of FIG. 9 above, the assigning module 901 may specifically include a first assigning unit 911 and a second assigning unit 921. The first assigning unit 911 is configured to assign bandwidth to each stream by using an average assignment method according to the preset total bandwidth of multiple streams and the maximum bandwidth of a single stream, where the obtained bandwidth corresponding to each stream is an average value of the total bandwidth of multiple streams. The second assigning unit 921 is configured to assign bandwidth to each stream by using a weighted assignment method according to the preset total bandwidth of multiple streams and the maximum bandwidth of a single stream, where the obtained bandwidth corresponding to each stream is a product of the total bandwidth of multiple streams and a weighting coefficient corresponding to the each stream. A sum of the bandwidth corresponding to the streams is smaller than or equal to the total bandwidth of multiple streams, and a maximum value in the bandwidth corresponding to the streams is smaller than or equal to the maximum bandwidth of a single stream.

Specifically, in the apparatus for adjusting site bandwidth according to the embodiment, the obtaining module 902 may specifically include a first determining unit 912 and a second determining unit 922. The first determining unit 912 is configured to determine, according to transmission of streams at the multi-screen site, whether each stream joins a conference, and when a stream is not received, determine that the conference joining state of the stream is unjoined. The second determining unit 922 is configured to: when a stream is received, detect change of the stream, and when content of the stream changes, determine that the conference joining state of the stream is normally joined; when content of the stream does not change, determine that the conference joining state of the stream is statically joined.

Specifically, in the apparatus for adjusting site bandwidth according to the embodiment, the first adjusting module 903 may include a comparing unit 913, a first adjusting unit 923, an obtaining unit 933, and a second adjusting unit 943. The comparing unit 913 is configured to compare an obtained conference joining state of each stream with a previous conference joining state of each stream, and obtain a comparison result of the conference joining state of each stream. The first adjusting unit 923 is configured to: when the conference joining state of one or more streams among the streams changes from normally joined or unjoined to statically joined, adjust bandwidth of the one or more streams whose conference joining state changes to statically joined among the streams to first stream bandwidth; and/or when the conference joining state of one or more streams among the streams changes from normally joined or statically joined to unjoined, adjust bandwidth of the one or more streams whose conference joining state changes to unjoined among the streams to second stream bandwidth. The obtaining unit 933 is configured to obtain first total bandwidth according to the number of streams that statically join the conference, the number of streams that do not join the conference, the first stream bandwidth, and the second stream bandwidth, where the first total bandwidth is a sum of a product of the first stream bandwidth and the number of streams that statically join the conference and a product of the second stream bandwidth and the number of streams that do not join the conference. The number of streams that statically join the conference is the number of streams currently in a statically joined state among the streams, and the number of streams that do not join the conference is the number of streams currently in an unjoined state among the streams. The second adjusting unit 943 is configured to use, according to the maximum bandwidth of a single stream and the remaining bandwidth, the average assignment method or the weighted assignment method to adjust bandwidth of streams in a normally joined state among the streams. The remaining bandwidth is a difference between the total bandwidth of multiple streams and the first total bandwidth.

Specifically, in the apparatus for adjusting site bandwidth according to the embodiment, the first adjusting module 903 may specifically include a third determining unit 953 and a third adjusting unit 963. The third determining unit 953 is configured to: when the conference joining state of the stream is normally joined, use a preset bandwidth adjustment time segment as a unit, and determine a bandwidth assignment coefficient corresponding to each stream that joins the conference. The third adjusting unit 963 is configured to adjust bandwidth of each stream in the preset bandwidth adjustment time segment to a product of the total bandwidth of multiple streams and a bandwidth assignment coefficient corresponding to the each stream, where a sum of the bandwidth assignment coefficients corresponding to the streams is smaller than or equal to 1.

Further, in the apparatus for adjusting site bandwidth according to the embodiment, the third determining unit 953 may specifically include a setting subunit 9531, a first calculating subunit 9532, a second calculating subunit 9533, and a third calculating subunit 9534. The setting subunit 9531 is configured to use an interval between adjacent frames of an image as a preset bandwidth adjustment time segment. The first calculating subunit 9532 is configured to calculate a sum of absolute pixel differences between a current-frame image and a previous-frame image of each stream, to obtain an image change pixel amplitude of each stream. The second calculating subunit 9533 is configured to obtain a sum of image change pixel amplitudes of the streams by calculation. The third calculating subunit 9534 is configured to perform a ratio operation to obtain a ratio of an image change pixel amplitude of each stream to the sum of the image change pixel amplitudes of the streams, and use the ratio as a bandwidth assignment coefficient of each stream.

Further, the apparatus for adjusting site bandwidth according to the embodiment may further include an encoding module 904, a counting module 905, and a second adjusting module 906. The encoding module 904 is configured to encode, in a previous preset bandwidth adjustment time segment, each stream according to bandwidth assigned to each stream in the preset bandwidth adjustment time segment, and obtain actual encoding bandwidth and an average quantization parameter of each encoded stream. The counting module 905 is configured to count, in a current preset bandwidth adjustment time segment, total output traffic of the streams in the previous preset bandwidth adjustment time segment according to the actual encoding bandwidth and the average quantization parameter of the streams in the previous preset bandwidth adjustment time segment. The second adjusting module 906 is configured to adjust target bandwidth and a quantization parameter or a frame rate of each stream in the current preset bandwidth adjustment time segment according to total output traffic of the streams.

Further, in the apparatus for adjusting site bandwidth according to the embodiment, the second adjusting module 906 may specifically include a fourth adjusting unit 916 and a fifth adjusting unit 926. The fourth adjusting unit 916 is configured to cause each stream to simultaneously skip encoding in the current preset bandwidth adjustment time segment when the total output traffic of the streams exceeds a preset stream traffic threshold, so that each stream is encoded in a next preset bandwidth adjustment time segment. The fifth adjusting unit 926 is configured to assign target bandwidth and a value range of a quantization parameter corresponding to each stream according to change of each stream in the current preset bandwidth adjustment time segment when the total output traffic of the streams does not exceed the preset stream traffic threshold, so that each stream is encoded according to the target bandwidth and the value range of the quantization parameter corresponding to each stream.

With the apparatus for adjusting site bandwidth according to the embodiment, the number of streams at the multi-screen site is obtained, corresponding bandwidth is assigned to each stream at the multi-screen site according to preset total bandwidth of multiple streams, maximum bandwidth of a single stream, and a preset bandwidth assignment method, and in a conference process, bandwidth of each stream is adjusted according to obtained conference joining state of each stream. The embodiment implements dynamic adjustment of bandwidth resources of each stream according to the actual condition of the conference, so that bandwidth resources of each site are fully utilized.

Figure 11:
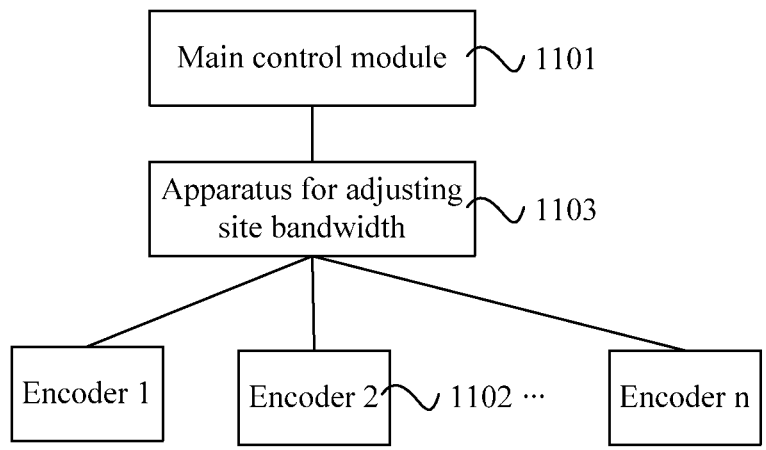
FIG. 11 is a schematic structural diagram of an embodiment of a conferencing terminal according to the present invention.

FIG. 11 is a schematic structural diagram of an embodiment of a conferencing terminal according to the present invention. As shown in FIG. 11, the embodiment further provides a conferencing terminal, which may include a main control module 1101 and multiple encoders 1102. The conferencing terminal in the embodiment may further include an apparatus 1103 for adjusting site bandwidth. The apparatus 1103 for adjusting site bandwidth may be the apparatus for adjusting site bandwidth as shown in FIG. 9 or FIG. 10, and is not described herein. In the embodiment, the main control module 1101 may be specifically configured to set total bandwidth of multiple streams and maximum bandwidth of a single stream, and output the total bandwidth of multiple streams and the maximum bandwidth of a single stream to the apparatus 1103 for adjusting site bandwidth. The apparatus 1103 for adjusting site bandwidth may adjust bandwidth of each stream at a multi-screen site according to the obtained total bandwidth of multiple streams and the obtained maximum bandwidth of a single stream by using the method for adjusting site bandwidth according to the preceding embodiment, and output the adjusted bandwidth of the streams to the corresponding encoders 1102, respectively. The multiple encoders 1102 are each configured to obtain the adjusted bandwidth of each stream from the apparatus 1103 for adjusting site bandwidth, and encode each stream according to the adjusted bandwidth of each stream.

Figure 12:
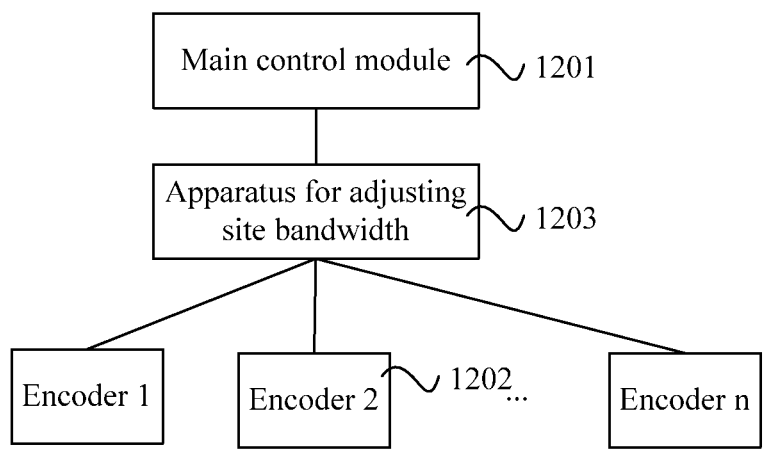
FIG. 12 is a schematic structural diagram of an embodiment of a media control server according to the present invention.

FIG. 12 is a schematic structural diagram of an embodiment of a media control server according to the present invention. As shown in FIG. 12, the embodiment further provides a media control server, which may include a main control module 1201 and multiple encoders 1202. The media control server in the embodiment may further include an apparatus 1203 for adjusting site bandwidth. The apparatus 1203 for adjusting site bandwidth may be the apparatus for adjusting site bandwidth as shown in FIG. 9 or FIG. 10, and is not described herein. The media control server in the embodiment may be specifically a multipoint control unit. In the embodiment, the main control module 1201 may be specifically configured to set total bandwidth of multiple streams and maximum bandwidth of a single stream, and output the total bandwidth of multiple streams and the maximum bandwidth of a single stream to the apparatus 1203 for adjusting site bandwidth. The apparatus 1203 for adjusting site bandwidth may adjust bandwidth of each stream at a multi-screen site according to the obtained total bandwidth of multiple streams and the obtained maximum bandwidth of a single stream by using the method for adjusting site bandwidth according to the preceding embodiment, and output the adjusted bandwidth of the streams to the corresponding encoders 1202, respectively. The multiple encoders 1202 are each configured to obtain the adjusted bandwidth of each stream from the apparatus 1203 for adjusting site bandwidth, and encode each stream according to the adjusted bandwidth of each stream.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may make modifications to the technical solutions described in the foregoing embodiments or make equivalent replacements to some technical features thereof, without departing from the idea and scope of the technical solutions of the embodiments of the present invention.

What is claimed is:

1. A method for adjusting site bandwidth, applicable to a conference process at a multi-screen site, wherein the method comprises:
obtaining a number of streams at the multi-screen site;
assigning bandwidth to each stream according to a preset total bandwidth of multiple streams, a maximum bandwidth of a single stream, and a preset bandwidth assignment method;
obtaining a conference joining state of each stream at the multi-screen site; and
adjusting bandwidth of each stream according to the conference joining state of each stream,
wherein obtaining the conference joining state of each stream at the multi-screen site comprises:
determining, according to transmission of streams at the multi-screen site, whether each stream joins a conference;
determining that a conference joining state of a stream is unjoined when the stream is not received;
detecting change of the stream when the stream is received;
determining that the conference joining state of the stream is normally joined when content of the stream changes; and
determining that the conference joining state of the stream is statically joined when content of the stream does not change.

2. The method according to claim 1, wherein assigning bandwidth to each stream according to the preset total bandwidth of multiple streams, the maximum bandwidth of a single stream, and the preset bandwidth assignment method comprises:
assigning bandwidth to each stream by using an average assignment method or a weighted assignment method according to the preset total bandwidth of multiple streams and the maximum bandwidth of a single stream, wherein assigning bandwidth to each stream by using the average assignment method comprises assigning the total bandwidth of multiple streams to the streams at the multi-screen site averagely, wherein assigning bandwidth to each stream by using the weighted assignment method comprises assigning each stream a product of the total bandwidth of multiple streams and a weighting coefficient corresponding to each stream;
wherein, a sum of the bandwidth corresponding to the streams is smaller than or equal to the total bandwidth of multiple streams, and wherein a maximum value in the bandwidth corresponding to the streams is smaller than or equal to the maximum bandwidth of a single stream.

3. The method according to claim 2, wherein adjusting bandwidth of each stream according to the conference joining state of each stream comprises:
comparing the obtained conference joining state of each stream with a previous conference joining state of each stream;
adjusting, when a conference joining state of one or more streams among the streams changes from normally joined or unjoined to statically joined, bandwidth of the one or more streams whose conference joining state changes to statically joined among the streams to first stream bandwidth;
adjusting, when a conference joining state of one or more streams among the streams changes from normally joined or statically joined to unjoined, bandwidth of the one or more streams whose conference joining state changes to unjoined among the streams to second stream bandwidth, wherein the first stream bandwidth is greater than the second stream bandwidth;
obtaining first total bandwidth according to the number of streams that statically join the conference, the number of streams that do not join the conference, the first stream bandwidth, and the second stream bandwidth, wherein the first total bandwidth is a sum of a product of the first stream bandwidth and the number of streams that statically join the conference and a product of the second stream bandwidth and the number of streams that do not join the conference, wherein the number of streams that statically join the conference is the number of streams currently in a statically joined state among the streams, and wherein the number of streams that do not join the conference is the number of streams currently in an unjoined state; and
using, according to the maximum bandwidth of a single stream and the remaining bandwidth, the average assignment method or the weighted assignment method to adjust bandwidth of streams in a normally joined state among the streams, wherein the adjusted bandwidth of each stream in a normally joined state is greater than the first stream bandwidth, and wherein the remaining bandwidth is a difference between the total bandwidth of multiple streams and the first total bandwidth.

4. The method according to claim 2, wherein when the conference joining state of the stream is normally joined, adjusting bandwidth of each stream according to the conference joining state of each stream comprises:
using a preset bandwidth adjustment time segment as a unit;
determining a bandwidth assignment coefficient corresponding to each stream in the bandwidth adjustment time segment; and
adjusting bandwidth of each stream in the preset bandwidth adjustment time segment to a product of the total bandwidth of multiple streams and the bandwidth assignment coefficient corresponding to each stream, wherein a sum of the bandwidth assignment coefficients corresponding to the streams is smaller than or equal to 1.

5. The method according to claim 4, wherein using the preset bandwidth adjustment time segment as the unit and determining the bandwidth assignment coefficient corresponding to each stream in the bandwidth adjustment time segment comprise:
using an interval between adjacent frames of an image as the preset bandwidth adjustment time segment;
calculating a sum of absolute pixel differences of a current-frame image and a previous-frame image of each stream in the bandwidth adjustment time segment to obtain an image change pixel amplitude of each stream;
obtaining a sum of the image change pixel amplitudes of the streams by calculation;
performing a ratio operation to obtain a ratio of an image change pixel amplitude of each stream to the sum of the image change pixel amplitudes of the streams; and
using the ratio as the bandwidth assignment coefficient of each stream.

6. The method according to claim 4, further comprising:
encoding, in a previous preset bandwidth adjustment time segment, each stream according to bandwidth assigned to each stream in the previous preset bandwidth adjustment time segment, and obtaining actual encoding bandwidth and an average quantization parameter of each encoded stream;
counting, in a current preset bandwidth adjustment time segment, total output traffic of the streams in the previous preset bandwidth adjustment time segment according to the actual encoding bandwidth and the average quantization parameter of the streams in the previous preset bandwidth adjustment time segment; and
adjusting target bandwidth of each stream and adjusting a quantization parameter or a frame rate of each stream in the current preset bandwidth adjustment time segment according to the total output traffic of the streams.

7. The method according to claim 6, wherein adjusting the target bandwidth and the quantization parameter or the frame rate of each stream in the current preset bandwidth adjustment time segment according to the total output traffic of the streams comprises:
causing, when the total output traffic of the streams in the previous preset bandwidth adjustment time segment exceeds a preset stream traffic threshold, each stream to simultaneously skip encoding in the current preset bandwidth adjustment time segment such that each stream is encoded in a next preset bandwidth adjustment time segment; and
assigning, when the total output traffic of the streams does not exceed the preset stream traffic threshold, the target bandwidth and a value range of the quantization parameter corresponding to each stream according to change of content of each stream in the current preset bandwidth adjustment time segment such that each stream is encoded according to the target bandwidth and the value range of the quantization parameter corresponding to each stream.

8. The method according to claim 2, wherein detecting change of the stream comprises detecting change of the stream by using a motion detection method or an intelligent detection method.

9. An apparatus for adjusting site bandwidth, applicable to a conference process at a multi-screen site, wherein the apparatus comprises:
an assigning module configured to obtain a number of streams at the multi-screen site, and assign bandwidth to each stream according to a preset total bandwidth of multiple streams, a maximum bandwidth of a single stream, and a preset bandwidth assignment method;
an obtaining module configured to obtain a conference joining state of each stream; and
a first adjusting module configured to adjust bandwidth of each stream according to the obtained conference joining state of each stream,
wherein the obtaining module comprises:
a first determining unit configured to determine, according to transmission of streams at the multi-screen site, whether each stream joins a conference, and when the stream is not received, determine that a conference joining state of the stream is unjoined; and
a second determining unit configured to detect change of a stream when the stream is received, determine that a conference joining state of the stream is normally joined when content of the stream changes, and determine that the conference joining state of the stream is statically joined when the content of the stream does not change.

10. The apparatus according to claim 9, wherein the assigning module comprises:
a first assigning unit configured to assign bandwidth to each stream by using an average assignment method according to the preset total bandwidth of multiple streams and the maximum bandwidth of a single stream, wherein assigning bandwidth to each stream by using the average assignment method comprises assigning the total bandwidth of multiple streams to the streams at the multi-screen site averagely; and
a second assigning unit configured to assign bandwidth to each stream by using a weighted assignment method according to the preset total bandwidth of multiple streams and the maximum bandwidth of a single stream, wherein assigning bandwidth to each stream by using the weighted assignment method comprises using a product of the total bandwidth of multiple streams and a weighting coefficient corresponding to each stream;
wherein a sum of the bandwidth corresponding to the streams is smaller than or equal to the total bandwidth of multiple streams, and
wherein a maximum value in the bandwidth corresponding to the streams is smaller than or equal to the maximum bandwidth of a single stream.

11. The apparatus according to claim 10, wherein the first adjusting module comprises:
a comparing unit configured to compare the obtained conference joining state of each stream with a previous conference joining state of each stream, and obtain a comparison result of the conference joining state of each stream;

a first adjusting unit configured to, when a comparison result of a conference joining state of one or more streams among the streams indicates that the conference joining state changes from normally joined or unjoined to statically joined, adjust bandwidth of the one or more streams whose conference joining state changes to statically joined among the streams to first stream bandwidth; and when a comparison result of a conference joining state of one or more streams among the streams indicates that the conference joining state changes from normally joined or statically joined to unjoined, adjust bandwidth of the one or more streams whose conference joining state changes to unjoined among the streams to second stream bandwidth, wherein the first stream bandwidth is greater than the second stream bandwidth;

an obtaining unit configured to obtain first total bandwidth according to the number of streams that statically join the conference, the number of streams that do not join the conference, the first stream bandwidth, and the second stream bandwidth, wherein the first total bandwidth is a sum of a product of the first stream bandwidth and the number of streams that statically join the conference and a product of the second stream bandwidth and the number of streams that do not join the conference, wherein the number of streams that statically join the conference is the number of streams currently in a statically joined state among the streams, and wherein the number of streams that do not join the conference is the number of streams currently in an unjoined state; and a second adjusting unit configured to use, according to the maximum bandwidth of a single stream and the remaining bandwidth, the average assignment method or the weighted assignment method to adjust bandwidth of streams in a normally joined state among the streams, wherein the adjusted bandwidth of each stream in a normally joined state is greater than the first stream bandwidth, and wherein the remaining bandwidth is a difference between the total bandwidth of multiple streams and the first total bandwidth.

12. The apparatus according to claim 10, wherein the first adjusting module comprises:

a third determining unit configured to, when the conference joining state of the stream is normally joined, use a preset bandwidth adjustment time segment as a unit, and determine a bandwidth assignment coefficient corresponding to each stream in the bandwidth adjustment time segment; and a third adjusting unit configured to adjust bandwidth of each stream in the preset bandwidth adjustment time segment to a product of the total bandwidth of multiple streams and the bandwidth assignment coefficient corresponding to each stream, wherein a sum of the bandwidth assignment coefficients corresponding to the streams is smaller than or equal to 1.

13. The apparatus according to claim 12, wherein the third determining unit comprises:

a setting subunit configured to use an interval between adjacent frames of an image as the preset bandwidth adjustment time segment;

a first calculating subunit configured to calculate a sum of absolute pixel differences of a current-frame image and a previous-frame image of each stream in the bandwidth adjustment time segment to obtain an image change pixel amplitude of each stream;

a second calculating subunit configured to obtain a sum of image change pixel amplitudes of the streams by calculation; and a third calculating subunit configured to perform a ratio operation to obtain a ratio of the image change pixel amplitude of each stream to the sum of the image change pixel amplitudes of the streams, and use the ratio as the bandwidth assignment coefficient of each stream.

14. The apparatus according to claim 12, further comprising:

an encoding module configured to encode, in a previous preset bandwidth adjustment time segment, each stream according to bandwidth assigned to each stream in the previous preset bandwidth adjustment time segment, and obtain actual encoding bandwidth and an average quantization parameter of each encoded stream;

a counting module configured to count, in a current preset bandwidth adjustment time segment, total output traffic of the streams in the previous preset bandwidth adjustment time segment according to the actual encoding bandwidth and the average quantization parameter of the streams in the previous preset bandwidth adjustment time segment; and a second adjusting module configured to adjust target bandwidth and a quantization parameter or a frame rate of each stream in the current preset bandwidth adjustment time segment according to the total output traffic of the streams.

15. The apparatus according to claim 14, wherein the second adjusting module comprises:

a fourth adjusting unit configured to cause each stream to simultaneously skip encoding in the current preset bandwidth adjustment time segment when the total output traffic of the streams exceeds a preset stream traffic threshold such that each stream is encoded in a next preset bandwidth adjustment time segment; and a fifth adjusting unit configured to assign the target bandwidth and a value range of the quantization parameter corresponding to each stream according to change of each stream in the current preset bandwidth adjustment time segment when the total output traffic of the streams does not exceed the preset stream traffic threshold such that each stream is encoded according to the target bandwidth and the value range of the quantization parameter corresponding to each stream.

16. A conferencing terminal, comprising a main control module;

multiple encoders; and an apparatus for adjusting site bandwidth applicable to a conference process at a multi-screen site, wherein the main control module is configured to set total bandwidth of multiple streams and maximum bandwidth of a single stream, and output the total bandwidth of multiple streams and the maximum bandwidth of a single stream to the apparatus for adjusting site bandwidth, wherein the multiple encoders are each configured to obtain adjusted bandwidth of each stream from the apparatus for adjusting site bandwidth, and encode each stream according to the adjusted bandwidth of each stream, wherein the apparatus for adjusting site bandwidth comprises an assigning module, an obtaining module, and a first adjusting module, wherein the assigning module is configured to obtain a number of streams at the multi-screen site, and assign bandwidth to each stream according to a preset total bandwidth of multiple streams, a maximum bandwidth of a single stream, and a preset bandwidth assignment method, wherein the obtaining module is configured to obtain a conference joining state of each stream, wherein the first adjusting module is configured to adjust bandwidth of each stream according to the obtained conference joining state of each stream, and wherein the obtaining module of the apparatus for adjusting site bandwidth comprises:
- a first determining unit configured to determine, according to transmission of streams at the multi-screen site, whether each stream joins a conference, and when the stream is not received, determine that a conference joining state of the stream is unjoined;
- a second determining unit configured to detect change of a stream when the stream is received, determine that a conference joining state of the stream is normally joined when content of the stream changes, and determine that the conference joining state of the stream is statically joined when the content of the stream does not change.

17. The conferencing terminal according to claim 16, wherein the assigning module of the apparatus for adjusting site bandwidth comprises:
- a first assigning unit configured to assign bandwidth to each stream by using an average assignment method according to the preset total bandwidth of multiple streams and the maximum bandwidth of a single stream, wherein assigning bandwidth to each stream by using the average assignment method comprises assigning the total bandwidth of multiple streams to the streams at the multi-screen site averagely; and
- a second assigning unit configured to assign bandwidth to each stream by using a weighted assignment method according to the preset total bandwidth of multiple streams and the maximum bandwidth of a single stream, wherein assigning bandwidth to each stream by using the weighted assignment method comprising using a product of the total bandwidth of multiple streams and a weighting coefficient corresponding to each stream, wherein a sum of the bandwidth corresponding to the streams is smaller than or equal to the total bandwidth of multiple streams, and wherein a maximum value in the bandwidth corresponding to the streams is smaller than or equal to the maximum bandwidth of a single stream.

18. The conferencing terminal according to claim 17, wherein the first adjusting module comprises:
- a comparing unit configured to compare the obtained conference joining state of each stream with a previous conference joining state of each stream, and obtain a comparison result of the conference joining state of each stream;
- a first adjusting unit configured to, when a comparison result of a conference joining state of one or more streams among the streams indicates that the conference joining state changes from normally joined or unjoined to statically joined, adjust bandwidth of the one or more streams whose conference joining state changes to statically joined among the streams to first stream bandwidth; and when a comparison result of a conference joining state of one or more streams among the streams indicates that the conference joining state changes from normally joined or statically joined to unjoined, adjust bandwidth of the one or more streams whose conference joining state changes to unjoined among the streams to second stream bandwidth, wherein the first stream bandwidth is greater than the second stream bandwidth;
- an obtaining unit configured to obtain first total bandwidth according to the number of streams that statically join the conference, the number of streams that do not join the conference, the first stream bandwidth, and the second stream bandwidth, wherein the first total bandwidth is a sum of a product of the first stream bandwidth and the number of streams that statically join the conference and a product of the second stream bandwidth and the number of streams that do not join the conference, wherein the number of streams that statically join the conference is the number of streams currently in a statically joined state among the streams, and wherein the number of streams that do not join the conference is the number of streams currently in an unjoined state; and
- a second adjusting unit configured to use, according to the maximum bandwidth of a single stream and the remaining bandwidth, the average assignment method or the weighted assignment method to adjust bandwidth of streams in a normally joined state among the streams, wherein the adjusted bandwidth of each stream in a normally joined state is greater than the first stream bandwidth, and wherein the remaining bandwidth is a difference between the total bandwidth of multiple streams and the first total bandwidth.

19. The conferencing terminal according to claim 17, wherein the first adjusting module comprises:
- a third determining unit configured to use, when the conference joining state of the stream is normally joined, a preset bandwidth adjustment time segment as a unit, and determine a bandwidth assignment coefficient corresponding to each stream in the bandwidth adjustment time segment; and
- a third adjusting unit configured to adjust bandwidth of each stream in the preset bandwidth adjustment time segment to a product of the total bandwidth of multiple streams and the bandwidth assignment coefficient corresponding to each stream, wherein a sum of the bandwidth assignment coefficients corresponding to the streams is smaller than or equal to 1.

20. The conferencing terminal according to claim 19, wherein the third determining unit comprises:
- a setting subunit configured to use an interval between adjacent frames of an image as the preset bandwidth adjustment time segment;
- a first calculating subunit configured to calculate a sum of absolute pixel differences of a current-frame image and a previous-frame image of each stream in the bandwidth adjustment time segment to obtain an image change pixel amplitude of each stream;
- a second calculating subunit configured to obtain a sum of image change pixel amplitudes of the streams by calculation; and
- a third calculating subunit configured to perform a ratio operation to obtain a ratio of the image change pixel amplitude of each stream to the sum of the image change pixel amplitudes of the streams, and use the ratio as the bandwidth assignment coefficient of each stream.

21. The conferencing terminal according to claim 19, further comprising:
- an encoding module configured to encode, in a previous preset bandwidth adjustment time segment, each stream according to bandwidth assigned to each stream in the previous preset bandwidth adjustment time segment, and obtain actual encoding bandwidth and an average quantization parameter of each encoded stream;

a counting module configured to count, in a current preset bandwidth adjustment time segment, total output traffic of the streams in the previous preset bandwidth adjustment time segment according to the actual encoding bandwidth and the average quantization parameter of the streams in the previous preset bandwidth adjustment time segment; and a second adjusting module configured to adjust target bandwidth and a quantization parameter or a frame rate of each stream in the current preset bandwidth adjustment time segment according to the total output traffic of the streams.

22. The conferencing terminal according to claim 21, wherein the second adjusting module comprises:

a fourth adjusting unit configured to cause each stream to simultaneously skip encoding in the current preset bandwidth adjustment time segment when the total output traffic of the streams exceeds a preset stream traffic threshold such that each stream is encoded in a next preset bandwidth adjustment time segment; and a fifth adjusting unit configured to assign the target bandwidth and a value range of the quantization parameter corresponding to each stream according to change of each stream in the current preset bandwidth adjustment time segment when the total output traffic of the streams does not exceed the preset stream traffic threshold such that each stream is encoded according to the target bandwidth and the value range of the quantization parameter corresponding to each stream.

23. A media control server, comprising:
a main control module;
multiple encoders; and
an apparatus for adjusting site bandwidth applicable to a conference process at a multi-screen site,
wherein the main control module is configured to set total bandwidth of multiple streams and maximum bandwidth of a single stream, and output the total bandwidth of multiple streams and the maximum bandwidth of a single stream to the apparatus for adjusting site bandwidth,
wherein the multiple encoders are each configured to obtain adjusted bandwidth of each stream from the apparatus for adjusting site bandwidth, and encode each stream according to the adjusted bandwidth of each stream,
wherein the apparatus for adjusting site bandwidth comprises an assigning module, an obtaining module, and a first adjusting module,
wherein the assigning module is configured to obtain a number of streams at the multi-screen site, and assign bandwidth to each stream according to a preset total bandwidth of multiple streams, a maximum bandwidth of a single stream, and a preset bandwidth assignment method,
wherein the obtaining module is configured to obtain a conference joining state of each stream,
wherein the first adjusting module is configured to adjust bandwidth of each stream according to the obtained conference joining state of each stream, and
wherein the obtaining module of the apparatus for adjusting site bandwidth comprises:
a first determining unit configured to determine, according to transmission of streams at the multi-screen site, whether each stream joins a conference, and when the stream is not received, determine that a conference joining state of the stream is unjoined; and a second determining unit configured to detect change of a stream when the stream is received, determine that a conference joining state of the stream is normally joined when content of the stream changes, and determine that the conference joining state of the stream is statically joined when the content of the stream does not change.

24. The media control server according to claim 23, wherein the assigning module of the apparatus for adjusting site bandwidth comprises:

a first assigning unit configured to assign bandwidth to each stream by using an average assignment method according to the preset total bandwidth of multiple streams and the maximum bandwidth of a single stream, wherein assigning bandwidth to each stream by using the average assignment method comprises assigning the total bandwidth of multiple streams to the streams at the multi-screen site averagely; and a second assigning unit configured to assign bandwidth to each stream by using a weighted assignment method according to the preset total bandwidth of multiple streams and the maximum bandwidth of a single stream, wherein assigning bandwidth to each stream by using the weighted assignment method comprises using a product of the total bandwidth of multiple streams and a weighting coefficient corresponding to each stream, wherein a sum of the bandwidth corresponding to the streams is smaller than or equal to the total bandwidth of multiple streams, and wherein a maximum value in the bandwidth corresponding to the streams is smaller than or equal to the maximum bandwidth of a single stream.

25. The media control server according to claim 24, wherein the first adjusting module comprises:

a comparing unit configured to compare the obtained conference joining state of each stream with a previous conference joining state of each stream, and obtain a comparison result of the conference joining state of each stream;

a first adjusting unit configured to, when a comparison result of a conference joining state of one or more streams among the streams indicates that the conference joining state changes from normally joined or unjoined to statically joined, adjust bandwidth of the one or more streams whose conference joining state changes to statically joined among the streams to first stream bandwidth; and when a comparison result of a conference joining state of one or more streams among the streams indicates that the conference joining state changes from normally joined or statically joined to unjoined, adjust bandwidth of the one or more streams whose conference joining state changes to unjoined among the streams to second stream bandwidth, wherein the first stream bandwidth is greater than the second stream bandwidth;

an obtaining unit configured to obtain first total bandwidth according to the number of streams that statically join the conference, the number of streams that do not join the conference, the first stream bandwidth, and the second stream bandwidth, wherein the first total bandwidth is a sum of a product of the first stream bandwidth and the number of streams that statically join the conference and a product of the second stream bandwidth and the number of streams that do not join the conference, wherein the number of streams that statically join the conference is the number of streams currently in a statically joined state among the streams, and wherein the number of streams that do not join the conference is the number of streams currently in an unjoined state; and a second adjusting unit configured to use, according to the maximum bandwidth of a single stream and the remaining bandwidth, the average assignment method or the weighted assignment method to adjust bandwidth of streams in a normally joined state among the streams, wherein the adjusted bandwidth of each stream in a normally joined state is greater than the first stream bandwidth, and wherein the remaining bandwidth is a difference between the total bandwidth of multiple streams and the first total bandwidth.

26. The media control server according to claim 24, wherein the first adjusting module comprises:

a third determining unit configured to use, when the conference joining state of the stream is normally joined, a preset bandwidth adjustment time segment as a unit, and determine a bandwidth assignment coefficient corresponding to each stream in the bandwidth adjustment time segment; and a third adjusting unit configured to adjust bandwidth of each stream in the preset bandwidth adjustment time segment to a product of the total bandwidth of multiple streams and the bandwidth assignment coefficient corresponding to each stream, wherein a sum of the bandwidth assignment coefficients corresponding to the streams is smaller than or equal to 1.

27. The media control server according to claim 26, wherein the third determining unit comprises:

a setting subunit configured to use an interval between adjacent frames of an image as the preset bandwidth adjustment time segment;

a first calculating subunit configured to calculate a sum of absolute pixel differences of a current-frame image and a previous-frame image of each stream in the bandwidth adjustment time segment to obtain an image change pixel amplitude of each stream;

a second calculating subunit configured to obtain a sum of image change pixel amplitudes of the streams by calculation; and a third calculating subunit configured to perform a ratio operation to obtain a ratio of the image change pixel amplitude of each stream to the sum of the image change pixel amplitudes of the streams, and use the ratio as the bandwidth assignment coefficient of each stream.

28. The media control server according to claim 26, further comprising:

an encoding module configured to encode, in a previous preset bandwidth adjustment time segment, each stream according to bandwidth assigned to each stream in the previous preset bandwidth adjustment time segment, and obtain actual encoding bandwidth and an average quantization parameter of each encoded stream;

a counting module configured to count, in a current preset bandwidth adjustment time segment, total output traffic of the streams in the previous preset bandwidth adjustment time segment according to the actual encoding bandwidth and the average quantization parameter of the streams in the previous preset bandwidth adjustment time segment; and a second adjusting module configured to adjust target bandwidth and a quantization parameter or a frame rate of each stream in the current preset bandwidth adjustment time segment according to the total output traffic of the streams.

29. The media control server according to claim 28, wherein the second adjusting module comprises:

a fourth adjusting unit configured to cause each stream to simultaneously skip encoding in the current preset bandwidth adjustment time segment when the total output traffic of the streams exceeds a preset stream traffic threshold such that each stream is encoded in a next preset bandwidth adjustment time segment; and a fifth adjusting unit configured to assign the target bandwidth and a value range of the quantization parameter corresponding to each stream according to change of each stream in the current preset bandwidth adjustment time segment when the total output traffic of the streams does not exceed the preset stream traffic threshold such that each stream is encoded according to the target bandwidth and the value range of the quantization parameter corresponding to each stream.

* * * * *